(12) United States Patent
Furukawa et al.

(10) Patent No.: US 8,083,339 B2
(45) Date of Patent: Dec. 27, 2011

(54) INK SET, TREATING LIQUID, RECORDING LIQUID, IMAGE RECORDING APPARATUS AND IMAGE RECORDING METHOD

(75) Inventors: Juichi Furukawa, Atsugi (JP); Hiroshi Adachi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 440 days.

(21) Appl. No.: 11/418,221

(22) Filed: May 5, 2006

(65) Prior Publication Data

US 2006/0203056 A1    Sep. 14, 2006

Related U.S. Application Data

(63) Continuation of application No. PCT/JP2004/016897, filed on Nov. 8, 2004.

(30) Foreign Application Priority Data

Nov. 7, 2003  (JP) ................. 2003-379036

(51) Int. Cl.
*C09D 11/00* (2006.01)
(52) U.S. Cl. ..................... 347/100; 106/31.13
(58) Field of Classification Search ............. 347/100; 106/31.13
See application file for complete search history.

(56) References Cited

U.S. PATENT DOCUMENTS

| | | | |
|---|---|---|---|
| 5,623,294 A * | 4/1997 | Takizawa et al. ............ 347/98 |
| 5,801,738 A * | 9/1998 | Stoffel et al. ............... 347/100 |
| 6,454,402 B1 * | 9/2002 | Koitabashi et al. .......... 347/100 |
| 6,517,199 B1 | 2/2003 | Tomioka et al. | |
| 6,533,406 B2 * | 3/2003 | Katsuragi et al. ............ 347/96 |
| 6,536,890 B1 * | 3/2003 | Kato et al. ................... 347/100 |
| 2002/0062762 A1 * | 5/2002 | Tomioka et al. ............. 106/31.33 |
| 2002/0069789 A1 | 6/2002 | Katsuragi et al. | |
| 2003/0107631 A1 * | 6/2003 | Goto et al. ................... 347/100 |
| 2003/0116055 A1 | 6/2003 | Kubota et al. | |
| 2004/0125185 A1 * | 7/2004 | Takada et al. ............... 347/100 |
| 2005/0012798 A1 * | 1/2005 | Adachi et al. ............... 347/100 |
| 2006/0057339 A1 | 3/2006 | Adachi et al. | |
| 2006/0061643 A1 * | 3/2006 | Furukawa et al. ........... 347/101 |

FOREIGN PATENT DOCUMENTS

| | | |
|---|---|---|
| EP | 1 106 658 | 6/2001 |
| JP | 2675001 | 7/1997 |
| JP | 11-222568 A | 8/1999 |
| JP | 2001-199149 | 7/2001 |
| JP | 2001-199151 | 7/2001 |
| JP | 2002-172847 | 6/2002 |
| JP | 2002-201385 | 7/2002 |

(Continued)

*Primary Examiner* — Laura Martin
(74) *Attorney, Agent, or Firm* — Oblon, Spivak, McClelland, Maier & Neustadt, L.L.P.

(57) ABSTRACT

To provide an ink set including a recording liquid and a treating liquid capable of obtaining a high-quality-image printed matter. To provide the high-quality-image printed matter by using the ink set including the recording liquid and the treating liquid, where the component and property of the treating liquid and the recording liquid are adjusted, moreover a combination of the component and the property is adjusted. The ink set includes: the recording liquid which includes a coloring material; and the treating liquid which includes a component reactive with a component of the recording liquid. By superimposing the treating liquid and the recording liquid on a record medium, a record part is formed which includes a first layer formed of the recording liquid, and a second layer formed of the treating liquid. The treating liquid has the surface tension γ expressed by $10 \text{ mN/m} \leq \gamma \leq 60 \text{ mN/m}$.

15 Claims, 8 Drawing Sheets

FOREIGN PATENT DOCUMENTS

| | | |
|---|---|---|
| JP | 2002-332438 | 11/2002 |
| JP | 2003-160750 | 6/2003 |
| WO | WO 03/057787 A1 | 7/2003 |
| WO | WO 03057787 A1 * | 7/2003 |

* cited by examiner

Step 1

Step 2

Step 3

Step 1

Step 2

Step 3

A
B
C
D

Step 1

Step 2

Step 3

Step 1

Step 2

Step 3

ATTACHMENT

INK SET, TREATING LIQUID, RECORDING LIQUID, IMAGE RECORDING APPARATUS AND IMAGE RECORDING METHOD

CROSS-REFERENCE TO RELATED APPLICATIONS

This is a continuation of Application No. PCT/JP2004/016897, filed on Nov. 8, 2004.

BACKGROUND OF THE INVENTION

1. Field of the Invention

The present invention relates to a printing technology of an ink jet printer. More specifically, the present invention relates to an ink set, a treating liquid, a recording liquid, an image recording apparatus, and an image recording method.

2. Description of Related Art

An image recording method carrying out an image recording with a recording liquid (containing a coloring material) as a droplet is excellent in that a printing mechanism thereof is simple and that the method is free from noise.

On the other hand, however, the above image recording method in combination with some record media may cause an image defect typical example thereof including a feathering, thus greatly decreasing an image quality. In terms of the above problem, suppressing permeability of the recording liquid is being tried for decreasing the feathering. Suppressing the permeability, however, may deteriorate dryness of the recording liquid, thus adhering the recording liquid to a hand when the hand touches a printed matter after printing, or smearing the image, which is another problem.

Printing a color image may superimpose one after another the recording liquids with different colors, thus bleeding or mixing the color ink on a color boundary, resulting in a greatly decreased image quality. For decreasing the color bleeding, the permeability of the recording liquid is tried to be increased. Increasing the recording liquid, however, may cause the coloring material to enter the record medium, thus decreasing the image density and increasing permeation of the recording liquid to backside of the record medium. With this, a both-side print may not be carried out preferably.

The image recording method is desired to solve the above problems at the same time and increase the image quality.

With respect to the above problems, methods of combining the recording liquid with a treating liquid are proposed, where the treating liquid contains a component that can form an aggregate with a coloring material in the recording liquid.

Japanese Patent (JP-B) No. 2675001 discloses a method of using, as a treating liquid, a liquid that is a colorless or hypochromic and contains polyvalent metal compound. Japanese Patent Application Laid-Open (JP-A) No. 2002-332438 discloses a method of using a treating liquid containing fine-particles in a dispersed state, where the fine-particles have a surface which is so charged as to have different polarity from that of a recording liquid. JP-A No. 2002-332438 is, however, not sufficient in terms of image quality. Especially, the liquid containing, in the dispersed state, the reactive fine particles can be added by a greater amount of reactive components by suppressing liquid viscosity increase, compared with the treating liquid of Japanese Patent (JP-B) No. 2675001 which dissolves the polyvalent metal compound. Compared with the polyvalent metal compound and the like, the above fine particles are larger in nature, thereby may form a large aggregate when the dispersed state is collapsed by the reaction of the fine particle with the coloring material. As a result, a great viscosity increase may occur, and thereby may suppress fluidity of the coloring material, thus improving the image by preventing the feathering and the like.

In the printing method of reacting two liquids (recording liquid and treating liquid) on the record medium, the lower the surface tension of the treating liquid is, the more widely the treating liquid spreads near the surface of the recording medium. With this, the treating liquid may become better in terms of embedding to the surface of the record medium, thereby the coloring material of the recording liquid may more stay on the surface of paper, thus improving the image including such properties as image density, back-through density and chroma. The treating liquid having lower surface tension may spread more widely. With this, even a small amount of treating liquid is sufficient for suppressing the permeation (caused by the aggregate reaction) of the recording liquid into the record medium, resulting in decreased total amount of liquid, thereby decreasing problems such as the feathering, the color bleeding and cockling.

The treating liquid having the low surface tension of less than 35 mN/m may, as a matter of fact, cause bubble in the loading of the treating liquid to a nozzle head, thus frequently causing discharge failure attributable to the bubble. With this, it may become difficult to secure discharge stability of all the nozzles, disenabling to stably produce the high-quality-image printed matter.

It is an object of the present invention to provide an ink set including a recording liquid and a treating liquid capable of obtaining a high-quality-image printed matter.

It is another object of the present invention to provide the ink set where the component and property of the treating liquid and the recording liquid are adjusted, moreover a combination of the component and the property is adjusted.

It is still another object of the present invention to provide an image recording apparatus and an image recording method using the ink set.

SUMMARY OF THE INVENTION

The treating liquid of the present invention at least contains a component reactive with a component in a recording liquid. The treating liquid has a surface tension $\gamma$ expressed by 10 mN/m$\leq\gamma\leq$60 mN/m.

In the ink set of the present invention, the two liquids are so aggregated as to be in a form of layers in the image recording method that reacts the two liquids on the record medium, and most of the coloring materials in the recording liquid are free from mixture with the treating liquid. Using an image recording apparatus having the above ink set can concentrate more coloring materials near the surface of the record medium, thus bringing about the high-quality-image printed matter having high image density, low back-through density and high chroma. Moreover, the lower the surface tension of the treating liquid is, the more the treating liquid embeds the record medium, thus more suppressing permeation of the coloring material. In sum, the treating liquid has a preferable surface tension $\gamma$ expressed by 10 mN/m$\leq\gamma\leq$60 mN/m.

Of the present invention, in the image forming that reacts the two liquids on the record medium, the two liquids are so aggregated as to be in a form of layers and most of the coloring materials in the recording liquid are free from mixture with the treating liquid. Using the above image recording method can concentrate more coloring materials near the surface of the record medium, thus bringing about the high-quality-image printed matter having high image density, low back-through density and high chroma. In this case, the lower the surface tension of the treating liquid is, the more the treating liquid embeds the record medium, thus more suppressing permeation of the coloring material.

Of the present invention, the treating liquid's component reactive with the recording liquid's component may be a polyvalent metal compound or may be a fine particle.

In the image forming of the present invention reacting the two liquids on the record medium, the treating liquid's component reactive with the recording liquid's component may be cationic while the coloring material in the recording liquid is preferred to be anionic, namely, having an inverse polarity. The fine particle of the cationic treating liquid's component which particle having $\zeta$ potential (ZETA potential) of +5 mV to +90 mV is high in terms of reactivity, thereby bringing about high-quality-image printed matter by the image recording method using the treating liquid containing the cationic fine particle.

Of the present invention, the treating liquid containing the coloring material having the cationic component reactive with the recording liquid is unlikely to cause the color bleeding. Hereinabove, the coloring material may be a pigment or a dye.

Of the present invention, the treating liquid containing a cationic surfactant or a nonionic surfactant can increase dispersion stability of the treating liquid's component having reactivity with the recording liquid, and can effectively decrease the surface tension of the treating liquid.

The treating liquid which contains an acid and has a pH of 2 to 7 may increase the dispersion stability of the treating liquid's component having reactivity with the recording liquid. The pH less than 2 may make it difficult to secure contact liquid property of the ink head.

The acid having a temporary dissociation constant of 5 pKa or less may increase the dispersion stability of the treating liquid's component reactive with the recording liquid.

Moreover, the treating liquid is preferred to have defoaming agent, with a proper usage (0.001% by mass to 10% by mass), thus suppressing foaming of the treating liquid and preventing discharge failure which may be attributable to the involved foaming, and thereby stably obtain the printed matter.

The recording liquid of the present invention contains at least the coloring material. On the record medium, the recording liquid and the treating liquid are reacted, thus forming a record part including a first layer formed of the recording liquid's component and a second layer (separated from the first layer) formed of the treating liquid's component.

The recording liquid containing the component reactive with the treating liquid's component can bring about the high-quality-image printed matter. The coloring material in the recording liquid being anionic is especially excellent, therefore the recording liquid is preferred to be anionic. When the recording liquid's component reactive with the treating liquid's component is fine particle, a large aggregate may occur upon contact of the two liquids (recording liquid and treating liquid), thus bringing about the printed matter with especially high-quality-image. Using pigment for the coloring material can bring about the printed matter that is excellent in water resistance and light resistance.

On the other hand, using the dye for the coloring material can bring about a visible printed matter that is excellent in chroma and brightness.

The recording liquid containing the anionic surfactant or the nonionic surfactant can secure the dispersion stability of the recording liquid's component reactive with the treating liquid's component and the dispersion stability of the coloring material. When the recording liquid's component reactive with the treating liquid's component is fine particle, a large aggregate may occur, thus bringing about the printed matter with higher-quality-image. Of the present invention, the fine anionic fine particle in the recording liquid which particle having $\zeta$ potential of −90 mV to −5 mV is high in terms of reactivity with the treating liquid, thereby bringing about high-quality-image printed matter.

The recording liquid containing a base and having pH of 7 to 12 can secure the dispersion stability of the recording liquid's component reactive with the treating liquid's component and the dispersion stability of the coloring material.

The base having the temporary dissociation constant of 5 pKa or less may increase the dispersion stability of the recording liquid's component reactive with the treating liquid.

The ink set of the present invention includes the recording liquid and the treating liquid, where the recording liquid contains the coloring material and the treating liquid contains the component having reactivity with the recording liquid's component. Superimposing the treating liquid with the recording liquid on the record medium may form the record part including the first layer formed of the recording liquid and the second layer (separated from the first layer) formed of the treating liquid. Hereinabove, the treating liquid has the surface tension $\gamma$ expressed by 10 mN/m$\leq\gamma\leq$60 mN/m.

Of the present invention, preparing the ink set made by combining any of the recording liquids with any of the treating liquids and then reacting the above two liquids on the record medium can bring about the high-quality-image recorded matter. Causing the treating liquid to have the surface tension lower than that of the recording liquid can spread the treating liquid more widely on the record medium than the recording liquid, thus preventing the feathering. With the treating liquid having the surface tension greater than the recording liquid by a difference of 2 mN/m or more, the treating liquid may spread more widely on the record medium than the recording liquid, thus further preventing the feathering. With the pH difference of 2 or more between the treating liquid and the recording liquid, a density slope may occur upon contact of the two liquids, thus accelerating the pH change and thereby shortening the reaction time. With this, the feathering and the color bleeding can be suppressed, bringing about the printed matter with higher-quality image.

A discharge amount M1 of the treating liquid and a discharge amount M2 of the recording liquid expressed by 0.2$\leq$M1/M2$\leq$3.0 can better balance the reactive components and thereby leave a slight amount of unreacted components, thus preparing the printed matter with still higher-quality image. Adjusting the property and component of the recording liquid and treating liquid, then properly adjusting the balance of the ink set with the above combination, and then reacting the two liquids on the record medium can make the recorded matter having high-quality-image.

The image recording method of the present invention includes applying simulation to the ink set and jetting the ink for recording the image.

The image recording method using the above prepared treating liquid, the above prepared recording liquid and the ink set having the combination of the treating liquid and the recording liquid can make the high-quality-image printed matter.

The image recording apparatus of the present invention comprises: a jetting unit configured to jet an ink set by applying a stimulation to the ink set, to thereby record an image.

The image recording apparatus using the ink set which is any one of the above prepared treating liquid, the above prepared recording liquid and a combination thereof can record a high-quality-image printed matter.

The treating liquid cartridge of the present invention has a receptacle for receiving therein the treating liquid of the present invention.

The recording liquid cartridge of the present invention has a receptacle for receiving therein the recording liquid of the present invention.

Receiving the above prepared treating liquid in the ink cartridge can secure the storage stability of the treating liquid, thus facilitating handling of the treating liquid. Receiving the above prepared recording liquid in the ink cartridge can secure the storage stability of the recording liquid, thus facilitating handling of the recording liquid.

An ink recorded matter of the present invention has an image formed on the record medium, by using the ink set of the present invention.

DESCRIPTION OF THE PREFERRED EMBODIMENTS (Treating Liquid)

A treating liquid of the present invention comprises: a component having a reactivity with a component in a recording liquid. The treating liquid of the present invention further comprises a defoaming agent, a surfactant and acid, when necessary, other components. The treating liquid has a surface tension γ in a range expressed by 10 mN/m≦γ≦60 mN/m.

A record part formed by applying to a record medium the treating liquid and the recording liquid used with the treating liquid comprises: a first layer formed of the recording liquid, and a second layer formed of the treating liquid.

An image recording method according to a prior art reacts a recording liquid (containing a coloring material) with a treating liquid on the record medium by mixing. With this, a sufficient reaction is not obtained until the recording liquid and the treating liquid make a sufficient mixture. In the mixing time, the coloring material may penetrate in-depth into the record medium, thus failing to obtain the printed matter with sufficient image quality. After studying hard, the present inventors have found the following:

A cross section of a printed matter printed by an image recording method which reacts two liquids (namely, the recording liquid and the treating liquid) on a record medium and which uses an ink set including the recording liquid's component and the treating liquid's component which are so adjusted as to have extremely high reactivity and to form large aggregates shows that a layer mainly formed of the coloring material and the treating liquid's component reactive with the recording liquid's component individually aggregate and form a structure fixed to the record medium. With the image recording method forming the multilayer structure where most of the coloring materials and most of the treating liquid's reactive components are not mixed, the coloring material may adhere in the vicinity of the surface of the record medium with high density, thereby bringing about high-image-quality printed matter with high image density, low back-through density and high chroma and free from feathering and color bleeding.

Figure 6A:
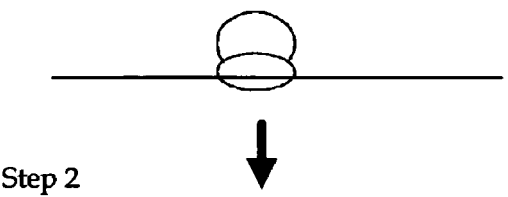
FIG. 6A and FIG. 6B each show a flow chart of a mechanism of making a printed matter by the image forming method. The printed matter with an ink set forming multilayer structure in FIG. 6B has higher image quality than that according to a prior art in FIG. 6A.
Figure 6A:
Figure 6A:
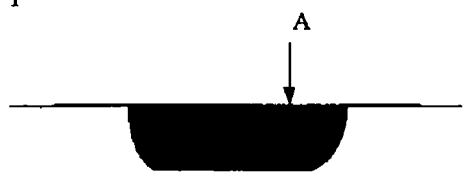
Figure 6B:
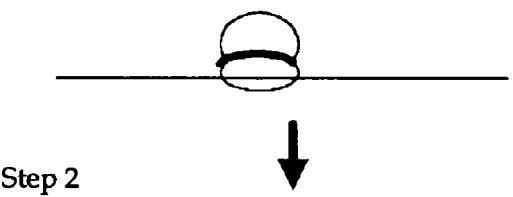
Figure 6B:
Figure 6B:
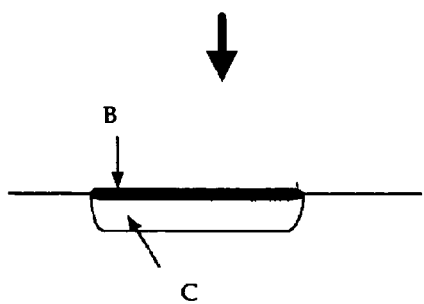

The reason for forming the above multilayer structure is yet to be clarified, but the multilayer structure is inferred to be formed by the operations in FIG. 6B. The present invention is, however, not limited thereto.

With the ink set that forms the aggregate featuring the extremely good reactivity and having a large particle diameter, the recording liquid's reactive component and the treating liquid's reactive component having a contact may, at first, momentarily form a thin aggregate layer on an interface of the two. When the aggregate has a large particle diameter, an aggregate layer may act as a filter preventing penetration of a large-particle component such as an anionic coloring material in the recording liquid. Thereby, most of the large-particle components may stay on the surface layer of the record medium, and thereby may be unable to penetrate in-depth into the record medium. The above aggregate layer may be a semi-transparent film that allows penetration of water, ion, low molecular polyvalent metal compound and the like. In this case, the treating liquid's reactive component may react with an ion or salt which permeated from the recording liquid's side or may aggregate due to pH change, thus further preventing the in-depth permeation of the coloring material into the record medium. On the recording liquid's side, the anionic coloring material may react with an ion which permeated from the treating liquid's side or may cause decreased dispersion stability due to pH change, thus causing a coloring material-to-coloring material aggregate near the surface of the record medium. As a result, the coloring material may stay near the surface layer, forming the printed matter with high image density and low back-through density. Moreover, the increased density of the coloring material near the surface of the record medium may better embedding to the record medium, preparing the printed matter with high chroma, which effect is evident in a printing of plain paper having a great difference in the record medium's chroma and the coloring material's chroma.

Hereinabove, most of the coloring materials and most of the treating liquid's reactive components may individually react with ion or salt, or may individually aggregate due to pH change, thus forming the multilayer structure. The coloring material may also aggregate and fix, thereby making the printed matter excellent in water resistance, light resistance and fixing property.

Hereinafter described referring to the schematics in FIG. 6A and FIG. 6B are steps of forming the image. FIG. 6A shows steps of the prior art, while FIG. 6B shows steps of the ink set forming multilayer structure. In each of FIG. 6A and FIG. 6B, step 1 describes "soon after ink's impact," step 2 describes "aggregate reaction," and step 3 describes "fixing." Denoted by "A" in FIG. 6A is "aggregate," denoted by "B" in FIG. 6B is "recording liquid layer," and denoted by "C" in FIG. 6B is "treating liquid layer."

At an initial step of causing contact of the treating liquid and the recording liquid constituting the ink set of the present invention, an aggregate layer may be formed near the interface between the treating liquid and the recording liquid. After the formation of the aggregate layer, most of the coloring materials and most of the fine particles which are contained in each droplet cannot move through the thus formed aggregate layer due to large size thereof The acid in the treating liquid and the base in the recording liquid each having a small size are, however, capable of penetrating through a gap of the aggregate with ease, thus diffusing rapidly. The above diffusion of ions can also neutralize the remaining fine particles and the remaining coloring materials thus decreasing surface potential, and further thus breaking the dispersion state or the dissolution state, resulting in aggregate of all the fine particles and aggregate of all the coloring materials. The above aggregate steps can be momentarily completed by the diffusion of the ion. In other words, the image recording method of the present invention can complete the aggregate of the entire system before fluidization of the coloring material. In the above manner, the coloring material and the recording liquid can aggregate respectively, being substantially free from mixing with each other, thereby forming respectively an aggregate layer of the coloring materials and an aggregate layer of the fine particles.

Detailed description of FIG. 6A is made in terms of the prior art and detailed description of FIG. 6B is made in terms of the ink set forming multilayer structure.

—Prior Art—
Step 1: Soon After Ink's Impact
Step 2: Aggregate Reaction
(1) Solvent of two liquids (treating liquid and recording liquid) concentrated, deteriorating dryness.
(2) Reaction (mixing) allows in-depth permeation of coloring material.
(3) Permeated coloring material deteriorates embedding in the vicinity of record medium's surface.
Step 3: Fixing
Aggregate formed by mixture of reactive components is fixed.
—Ink Set Forming Multilayer Structure—
Step 1: Soon After Ink's Impact
(1) Aggregate reaction rapidly proceeds, forming an aggregate layer. Aggregate layer becomes semitransparent, thus transmitting ion while preventing coloring material.
(2) pH change is caused, polyvalent metal salt is transmitted. Most of coloring materials, and most of aggregate components of treating liquid individually lose dispersion stability, forming aggregate.

Step 2: Aggregate Reaction
(1) Semitransparent aggregate layer allows permeation of solvent, thereby removing solvent form recording liquid, improving dryness, and suppressing feathering and color bleeding.
(2) Most of coloring materials are blocked with aggregate layer, failing to permeate in-depth into record medium.
(3) Coloring material's density is increased in the vicinity of record medium, thus decreasing unevenness and bettering embedding.
Decreasing back-through density.
Increasing image density and chroma.
Step 3: Fixing
Multilayer structure of recoding layer and treating layer is formed and fixed.
Thin aggregate layer is present on interface.

Figure 9:
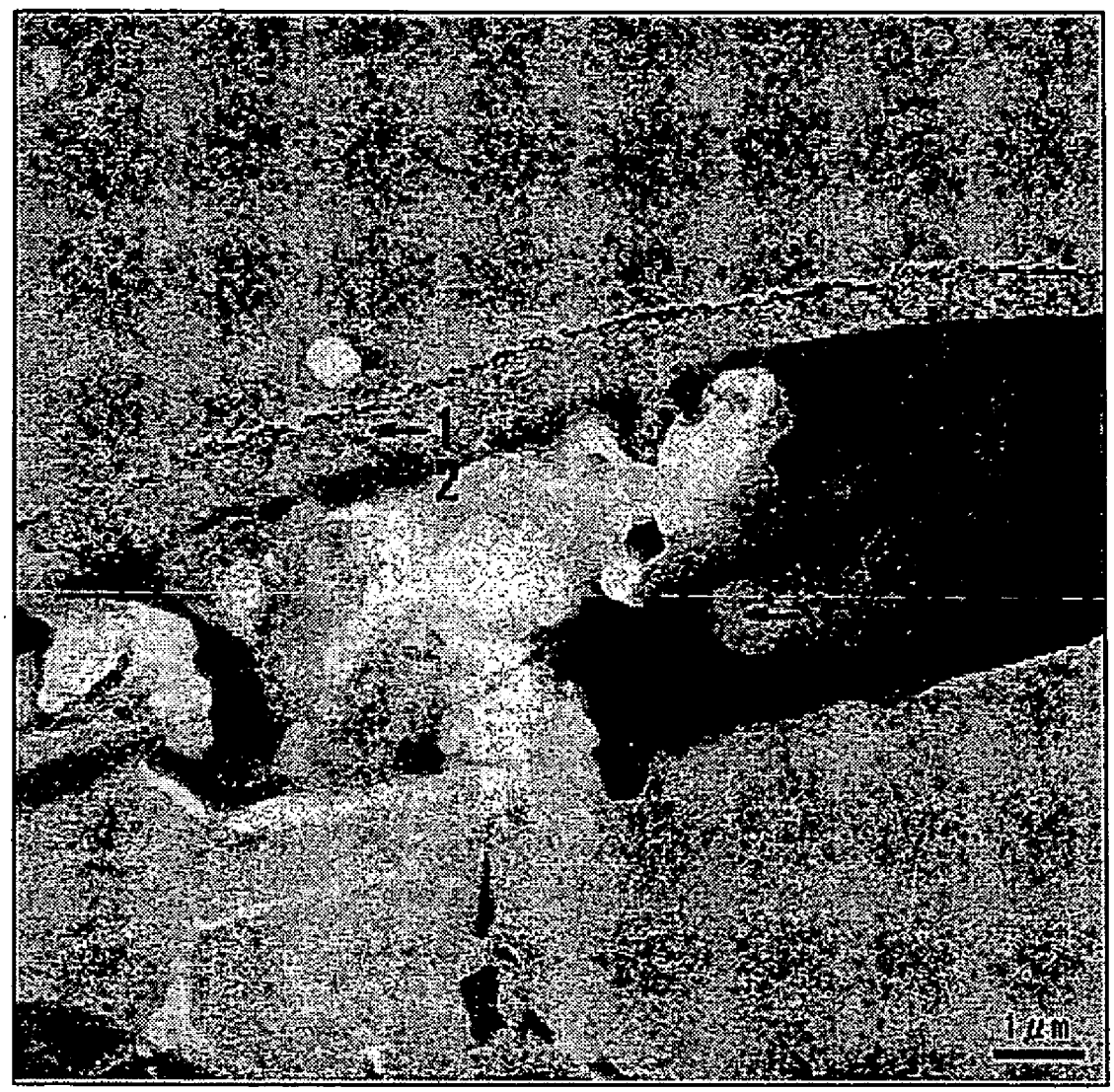
FIG. 9 is a cross sectional photograph of a recorded matter by a single pass printing which forms the image by a single scanning of an ink jet record head.
Figure 10:
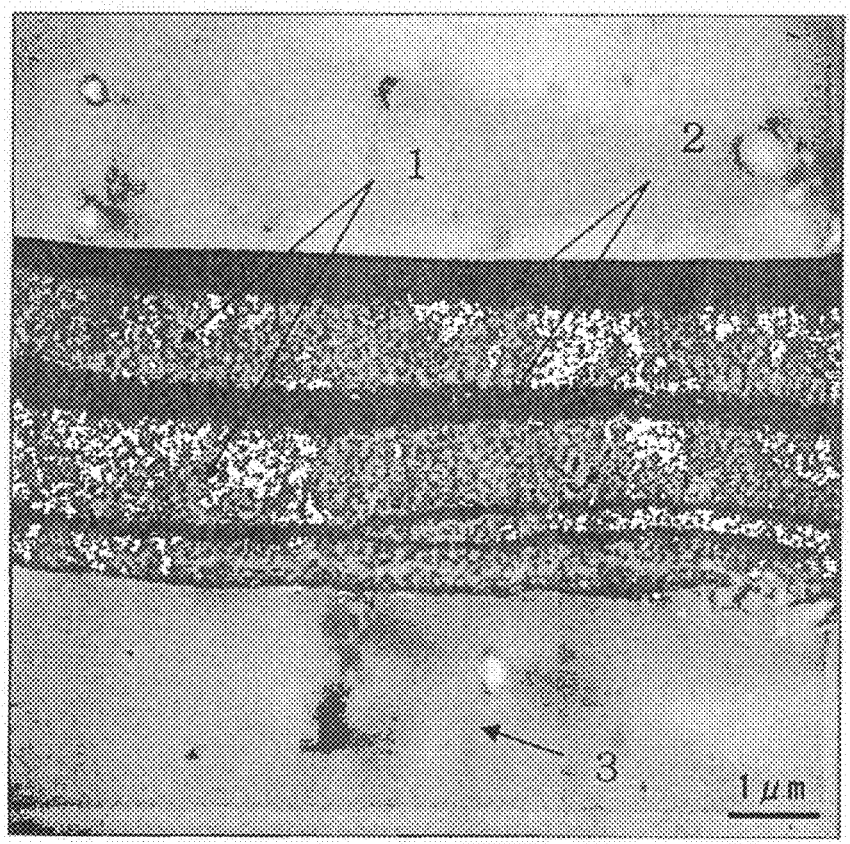
FIG. 10 is a cross sectional photograph of the recorded matter by a multiple of passes which form the image by a multiple of scannings of the ink jet record head.

The recorded matter has a cross section which can be viewed by cutting a black solid print part of the recorded matter and photographing with a transmission electronic microscope (TEM), an example of the TEM photograph (cross section) shown in FIG. 9 and FIG. 10.

FIG. 9 is a cross sectional photograph of the recorded matter by a single pass printing which forms the image by a single scanning of an ink jet record head, where "1" denotes the recording liquid layer, "2" denotes the treating liquid layer, and "3" denotes the record medium. FIG. 10 is a cross sectional photograph of the recorded matter by a multiple of passes which form the image by a multiple of scannings of the ink jet record head, where "1" denotes the recording is liquid layer, "2" denotes the treating liquid layer, and "3" denotes the record medium. Each of FIG. 9 and FIG. 10 shows a streak of variation (dense and airy). Carrying out an elementary density analysis (EDA) can specify that the dense part is the treating liquid layer (fine particle aggregate layer) and the airy part is the recording liquid layer (color aggregate layer).

Using the treating liquid of the present invention can bring about a coloring property as excellent as that of ink jet coat paper. In image areas with a lot of ink adhesion such as shadow part and solid print part, the amount of white mist and color unevenness may be small, thus making an excellent color evenness. The application of the cationic fine particle can be decreased in amount, thereby bringing about an excellent friction (or abrasion) resistance of the printed part, especially for plain paper printing, without damaging feeling of the plain paper.

Moreover, when the recording liquid and the treating liquid penetrate, the aggregate of the coloring material may be trapped by a porous part of the record medium. With this, the coloring material becomes less likely to move, thus effectively preventing the feathering and the color bleeding. Moreover, the high gloss of the fine particle itself may increase gloss of the printed matter by reaction with the recording liquid. Being semitransparent, the aggregate layer may cause the vehicle to penetrate rapidly into the record medium, thus preventing the feathering and the color bleeding. In addition, the dryness may be improved, thus decreasing wettability of the record medium.

Suppressing the ink's penetration to the backside of the record medium can accomplish a good both-side printing. The above operation of the present invention can bring about the recorded matter with higher printing quality than that according to the prior art.

In the image forming method for reacting the two liquids on the record medium, the surface tension $\gamma$ of the treating liquid for obtaining the high-image-quality printed matter meets 10 mN/m$\leq\gamma\leq$60 mN/m, more preferably 10 mN/m$\leq\gamma\leq$40 mN/m, still more preferably 10 mN/m$\leq\gamma\leq$35 mN/m, still more preferably 10 mN/m≦γ≦30 mN/m, and especially preferably 10 mN/m≦γ≦25 mN/m.

On the other hand, the surface tension γ of the treating liquid less than 15 mN/m may deteriorate the discharge stability. In this case, though having high image quality, the thus prepared printed matter may have an incomplete solid patch due to the above insecure discharge stability. Less than 10 mN/m hereinabove cannot secure the discharge stability of the treating liquid at all, making it impossible to prepare the printed matter in such a manner that all the nozzles have stable discharge.

The lower the surface tension of the treating liquid is, the higher the permeability of the treating liquid becomes, thus the treating liquid may be more embedded to the surface of the record medium, leading to a better coating. In this case, the recording liquid thereafter contacting the treating liquid may allow the aggregate (caused by the reaction) to cover the surface of the record medium with a further decreased gap. With this, the recording liquid can be less likely to permeate in-depth into the record medium through the gap where the treating liquid was not embedded. With this, the coloring material may be less likely to be permeated in-depth into the record medium, thus increasing the image density, decreasing the back-through density and increasing the chroma. Moreover, the feathering-and-bleeding caused by the recording liquid's permeation into the gap (where the treating liquid was not embedded) can be suppressed, thus preventing the feathering and the color bleeding.

With its surface tension decreased, the treating liquid may be sufficiently embedded to the surface of the record medium at a small amount, thus decreasing the required discharge amount of the treating liquid. In sum, the total adhesion of the treating liquid and the recording liquid can be decreased, thus preventing the cockling attributable to the swelling of the record medium.

Herein, the surface tension of the above treating liquid can be measured, for example, by the Wilhelmy (plate) method, using CBVP-Z made by Kyowa Interface Science Co., LTD.

—Defoaming Agent—

The treating liquid having the low surface tension can obtain the higher-image-quality printed matter. In this case, however, the treating liquid is likely to cause the foaming due to the low surface tension, thus occasionally causing treating liquid's discharge failure attributable to the foaming, leading to failure of obtaining the high-image-quality printed matter. Adding to the treating liquid a proper amount of the defoaming agent can stably bring about a high-quality-image printed matter, even in the case of a low-surface tension treating liquid.

Addition of the defoaming agent to the treating liquid is 0.001% by mass to 10% by mass, more preferably 0.001% by mass to 3% by mass and especially preferably 0.005% by mass to 0.5% by mass. Less than 0.001% by mass hereinabove may decrease the defoaming effect, and thereby the treating liquid is likely to be foamed and an air is likely enter the head, thus causing the discharge failure. More than 10% by mass hereinabove may cause the clogging to the ink head due to the component of the defoaming agent, failing to obtain the discharge stability.

JP-A No. 2001-301309, JP-A No. 2001-310545 and JP-A No. 2002-172847 disclose that the defoaming agent can be added to the treating liquid when the aggregate component in the treating liquid is the polyvalent metal component, however, any quantitative description in combination with the low surface tension is not made therein. The description is not made about the situation of adding the defoaming agent to the treating liquid when the treating liquid's aggregate component is fine particle.

Especially, the treating liquid containing the fine particle is preferred to contain the surfactant for securing the dispersion stability of the fine particle. The surfactant may act for more likely foaming.

The defoaming agent is preferred to be a dispersoid having dispersibility in the solvent of the treating liquid, and free from solubility in the solvent. Examples of the dispersoid include an inorganic fine particle, an organic fine particle, and a compound (organic and inorganic) fine particle. The defoaming agent is preferred to have the same polarity with that of the treating liquid's component reactive with the recording liquid's component. Otherwise, the defoaming agent is preferred to be nonionic.

The defoaming agent is not specifically limited, and therefore can be properly selected according to the object, preferable examples thereof including silicone defoaming agent.

In general, the silicone defoaming agent includes oil type, compound type, self-emulsification type, and emulsion type. In view of the use for water-system, however, the self-emulsion type and the emulsion type are preferred for securing reliability. Moreover, the following silicone defoaming agents may be used: amino-modified, carbinol-modified, methacryl-modified, polyether-modified, alkyl-modified, higher fatty acid ester-modified, alkylene oxide-modified, and the like.

Commercially available silicone defoaming agent includes silicone defoaming agent (KS508, KS531, KM72, KM85, and the like made by Shin-Etsu Chemical Co., Ltd.), silicone defoaming agent (Q2-3183A, SH5510, and the like made by Dow Corning Toray Silicone Co., Ltd.), silicone defoaming agent (SAG30 and the like made by Nihon Unicar), silicone defoaming agent (Adecanol series made by Asahi Denka Kogyo), and the like.

The defoaming agent is preferred to have particle diameter of 0.01 μm to 1.0 μm. Less than 0.01 μm may fail to obtain a sufficient defoaming effect, while more than 1.0 μm may cause failure to the discharge stability.

—Aggregate Component—

The treating liquid used for the image recording method of the present invention can have the following component which is reactive with the aggregate component in the recording liquid.

Of the present invention, the component of the treating liquid may be any of inorganic, organic and complex (organic and inorganic), moreover, may be polyvalent metal compound, fine particle, monomer, resin or polymer resin. The above components of the present invention is more advantageous than that according to the prior art.

—Polyvalent Metal Compound—

The polyvalent metal compound can be used as a cationic compound which can be added to the treating liquid of the present invention.

The polyvalent metal compound is constituted of a polyvalent metal ion (two or more valences) and an anion bonded to the polyvalent metal ion. The polyvalent metal compound may be any one of inorganic metal salt and organic metal salt.

Specific examples of the above polyvalent metal ion include divalent metal ions such as $Ca^{2+}$, $Cu^{2+}$, $Ni^{2+}$, $Mg^{2+}$, $Zn^{2+}$, $Ba^{2+}$ and the like; and trivalent metal ions such as $Al^{3+}$, $Fe^{3+}$, $Cr^{3+}$ and the like. As the anion, the examples include $Cl^-$, $NO^{3-}$, $I^-$, $Br^-$, $CH_3COO^-$ and the like.

As inorganic metal salt, the examples include alkali earth metal salt. As organic metal salt, the examples include polyvalent metal compounds of aldonic acid salt, alkyl acid salt, polyol phosphoric acid ester. The above examples are effective polyvalent metal compounds, the present invention is, however, not limited thereto.

—Polymer—

Examples of polymers having reactivity include cationic high molecular compounds such as poly allyl amine, polyvinyl amine, poly imine, polyvinyl pyrrolidone, poly ethylene imine, polyvinyl lysine, amino acetalized polyvinyl alcohol, ionene polymer, polyvinyl imidazole, polyvinyl benzil phosphonium, polyalkyl allyl ammonium, polyamidine, polyamine sulfone, cation starch and the like.

—Monomer—

Examples of monomers having reactivity with the coloring material include cationic compounds such as high alkyl amine, high alkyl ammonium compound and polyvalent amine compound.

The above monomers may be used in combination with the cationic high molecular compound.

Examples of high alkyl amine compounds and high alkyl ammonium compounds include lauryl amine, stearyl amine, cetyl amine, behenyl amine, dimethyl stearyl amine, lauryl trimethyl ammonium, cetyl trimethyl ammonium, stearyl trimethyl ammonium, behenyl trimethyl ammonium, dioctyl dimethyl ammonium, distearyl dimethyl ammonium, and stearyl dimethyl benzil ammonium. Moreover, ethylene oxide adduct thereof may be used.

Specific examples of the above polyvalent amine compounds include ethylene diamine, hexamethylene tetramine, piperazine, hexamethylene imine, hexamethylene diamine, diethylene triamine, tetraethylene pentamine, hepta ethylene octamine, nano ethylene decamine, triethylene tetramine, triethylene-bis(trimethylene)hexamine, bis(3-amino ethyl) amine methylene diamine, N,N'-bis-(3-amino propyl)putrescine, 1,4-diaza cycloheptane, 1,5-diaza cyclooctane, 1,4,11,14-tetraaza tocloeicosane, 1,2-diamino propane-3-ol, phenylene diamine, triamino benzene, tetraamino benzene, and pentaamino benzene.

—Fine Particle—

The fine particle can be raised as the component (contained in the treating liquid of the present invention) that has reactivity with the recording liquid's aggregate component. The fine particle may be any of an inorganic matter, an organic matter, and a complex (organic and inorganic) material.

Specific examples of the organic fine particle include polystyrene, styrene-acryl copolymer, polymethyl methacrylate, melamine resin, epoxy resin, silicone resin, benzoguanamine resin, polyamide resin, fluoro resin, polymers obtained by emulsion polymerization and the like of α,β-unsaturated ethylene monomer, and the like.

The inorganic fine particle is categorized into inorganic salt such as calcium carbonate, and inorganic oxide such as silica ($SiO_2$).

Specific examples of the inorganic salt include calcium carbonate, calcium nitrate, calcium chloride, calcium sulfate, aluminum nitrate, aluminum chloride, aluminum sulfate, and iron sulfate, but not limited thereto. For use as an aqueous treating liquid, calcium carbonate, calcium nitrate, and iron sulfate are preferable in view of low water solubility for easily obtaining dispersoid. Moreover, cationizing the above is more preferable for enhancing absorbing ability and aggregate ability of the coloring material. JP-A No. 10-129113 and JP-A No. 11-20301 disclose a method of improving quality by using cationic agent.

Of the inorganic fine particles, the inorganic oxide having an isoelectric point is especially preferable as the component contained in the treating liquid.

Specific examples of the inorganic oxide include silica ($SiO_2$), cationized product of silica, titanium dioxide, alumina ($Al_2O_3$), zirconia and the like, but not limited thereto.

Of the inorganic oxides, cationic silica is especially preferable in view of reactivity. The cationic silica having its surface cationized can be used. For the cationization, cationic compound is to be chemically and physically introduced to the silica surface. For example, coupling amino compound with the silanol group of silica, or chemically reacting the aluminum compound with the silanol group of silica can carry out the surface treatment. Otherwise, mixing the silica with the cationic compound in the solvent, and removing the solvent after physically absorbing the cationic compound can physically carry out the surface treatment. In this case, specific examples of anionic silica used for the core material include ST-ZL, ST-20, ST-30, ST-40, ST-C, ST-N, ST-O, ST-S, ST-50, ST-20L, ST-OL, ST-XS, ST-YL, ST-XL, ST-UP, and ST-OUP (made by Nissan Chemical Industries, Ltd.); Cataloid SI-350, SI-500 (made by DuPont); Nipgel AY-220, AY-420, AY-460 (made by Nippon silica); and the like. Not limited thereto, any of those having silica surface cationized can be preferably used.

The inorganic oxide can be obtained as product. Examples of silica cationized product includes ST-AK (made by Nissan Chemical Industries, Ltd.). Examples of alumina product includes Alumina Sol 100, 200, 520 (made by Nissan Chemical Industries, Ltd.) and the like. Examples of titanium dioxide product includes Titania Series (made by Idemitsu Kosan Co. Ltd.). Some of the above fine particles are obtainable as water dispersoid.

The treating liquid of the present invention may contain the cationic complex (inorganic and organic) fine particle.

The cationic complex (inorganic and organic) fine particle can cause the cationic organic compound to be absorbed to the surface of the inorganic fine particle, and on the other hand, cause the cationic inorganic compound to be absorbed to the surface of the organic compound. For example, the complex (inorganic and organic) fine particle coated with the cationic high molecule can be obtained by dispersing the inorganic fine particle in solvent such as water and then gradually adding thereto the cationic high molecule with water or with a water-soluble organic solvent in a solution state.

Specific examples of the above cationic high molecule include cationic high molecular compounds such as polyallyl amine, polyvinyl amine, polyimine, polyvinyl pyrrolidone, polyethylene imine, polyvinyl pyridine, amino acetalized polyvinyl alcohol, ionene polymer, polyvinyl imidazole, polyvinyl benzil phosphonium, polyalkyl allyl ammonium, polyamidine, polyamine sulfone, and cation starch.

Addition of the treating liquid's component reactive with the coloring material is preferred to be more than 5% by mass of the treating liquid, more preferably 15% by mass or more. Content of the addition less than 5% by mass may make the image-improving effect insufficient. In this case, a plurality of components can be combined. The fine particle reactive with the coloring material is preferred to be inorganic. The inorganic fine particle, especially an inorganic oxide has high reactivity with the coloring material, bringing about a high image quality with the ink set where the treating liquid (using the inorganic fine particle) and the recording liquid are combined.

Moreover, so adjusting the mixture as to have pH causing the inorganic oxide alone to aggregate can enhance the aggregation effect.

An average particle diameter of the component reactive with the coloring material is preferred to be 500 nm or less, more preferably 200 nm or less in view of discharge stability. More than 500 nm hereinabove is likely to cause clogging to the discharge head, thus causing discharge failure.

The average particle diameter can be measured with an optical particle distribution analyzer, showing a particle diameter of 50 number %.

The treating liquid of the present invention is preferred to contain the cationic compound, with preferable pH range of 2 to 7 for sufficiently securing the dispersion stability of the cationic compound.

The treating liquid of the present invention, for example, contains the fine particle (having cationic group on its surface) and an acid, where the fine particle has stabilized dispersion. Of the present invention, the preferable cationic treating liquid contains, for example, acid with its pH adjusted to 2 to 7, or has its ζ potential (electrokinetic potential) of +5 mV to +90 mV.

Hereinafter described is the ζ potential (ZETA potential) of the treating liquid. There is provided a system where the solid is dispersed in the liquid and a free electric charge is present on the surface of the solid phase. In the liquid phase in the vicinity of an interface with the solid phase hereinabove, generally, an inverse charge layer may be caused for keeping the electric neutrality. This is referred to as electric double layer, where the potential difference attributable to the electric double layer is referred to as ζ potential. When the ζ potential is plus, the surface of the fine particle may be cationic. When the ζ potential is minus, the surface of the fine particle may be anionic. Generally, the higher the absolute value thereof is, the more strongly the electrostatic repulsion may act between the fine particles, which is a state of good dispersibility and simultaneously the ion property of the fine particle's surface is strong. In other words, with the cationic fine particle, the higher the ζ is, the stronger the cationic property is, thus strongly attracting the anionic compound in the recording liquid.

After studying the relation between i) the ζ potential of the cationic treating liquid for the image formation and ii) the thus formed image quality, the present inventor has found the following: When the treating liquid having the ζ potential of +5 to +90 mV is used, the colored part formed on the record medium may show an especially excellent coloring property.

Though the reason therefor is yet to be clarified, the progress of the aggregation can be inferred in the following manner. The present invention is, however, not limited by the following inference.

The fine particle having the above ζ potential is properly cationic. Therefore, when the anionic compound in the recording liquid contacts the cationic compound in the treating liquid, a rapid aggregate may be caused to the interface, thus forming a thin aggregate layer. In this case, the aggregate layer may act as a filter for preventing, to a certain extent, the permeation of the anionic compound with large particle diameter such as the anionic coloring material in the recording liquid. Most of the anionic compounds having the large particle diameter may stay on the surface layer of the record medium, thus failing to permeate in-depth into the record medium. On the other hand, the aggregate layer may be a semitransparent film that allows transmission of water, ion, low molecular polyvalent metal compound, and the like. With this, the cationic fine particle may react with the ion or the salt transmitted through the semitransparent film, may aggregate due to pH change, thus further preventing the in-depth permeation of the coloring material into the record medium. As a result, the coloring material may stay on the surface, allowing the printed matter to have high image density and low back-through density. Moreover, in the vicinity of the record medium's surface, the coloring material caused to have increased density can better the embedding to the record medium, thereby preparing the printed matter with high chroma. This is especially effective for the plain paper where the chroma of the record medium and the chroma of the coloring material have a great difference.

Thereafter, most of the coloring materials and most of the cationic fine particles may individually react with the ion and the salt, may individually aggregate due to pH change, thus forming the multilayer structure. The coloring material may also aggregate and fix, thereby the printed matter becomes excellent in water resistance, light resistance, and fixing property.

Moreover, the following excellent effect can be obtained. Specifically, in an image area having as excellent coloring property as that of the coat paper for the ink jet, and having a great amount of recording liquid application such as shadow part and solid print part, use of the cationic treating liquid of the present invention can decrease white mist and color unevenness, bringing about and excellent color evenness. Moreover, compared with the coat paper, the cationic treating liquid of the present invention can extremely efficiently colors, thus decreasing adhesion amount of the cationic fine particles. With this, in the case of plain paper printing, especially, such a good image can be obtained as excellent in friction (or abrasion) resistance of the printed part, without damaging the paper feeling.

With the ζ potential of the cationic fine particle which can be contained in the treating liquid less than +5 mV, the fine particle cannot obtain the dispersion stability and cannot have strong reactivity with the anionic component, failing to obtain the printed matter with high image quality. More than +90 mV hereinabove may increase the dispersion stability too much, thus weakening the aggregate reactivity of the fine particle alone which reactivity is caused by the contact with the recording liquid, thus failing to obtain the high image quality.

In a more preferable range of the ζ potential, for example, +10 mV to +85 mV, use of the treating liquid containing the cationic fine particle may make the boundary between dots unremarkable in the solid printing, bringing about a good image having further decreased stripe unevenness by head scan. Moreover, use of the treating liquid containing the cationic fine particle with its ζ potential of +15 mV to +65 mV can bring about an image having an extremely excellent coloring property, irrespective of the paper type.

From the viewpoint of the storage stability and the anionic compound's absorption property, the cationic treating liquid of the present invention is preferred to have its pH containing acid and in a range of 2 to 7 around 25° C. Use of the treating liquid of the above pH range can prepare the high-image-quality printed matter. Although the reason therefor is not clarified, the progress of the aggregation can be inferred in the following manner. The present invention is, however, not limited by the following inference.

Use of the treating liquid having the above range of pH 2 to 7 can remarkably decrease the stability of the anionic compound on the interface upon contact with the anionic recording liquid, thus forming the semitransparent film of the aggregate layer. Most of the coloring materials can be blocked with the above semitransparent film, and thereby stay relatively on the surface of the record medium, failing to make the in-depth permeation into the record medium. Moreover, the proton and the metal ion in the treating liquid may transmit through the semitransparent film of the aggregate layer, thus allowing the coloring material alone to aggregate. As a result, the coloring material can be present with high density in the vicinity of the surface, thus bringing about the printed matter with high image density and low back-through density. Moreover, with the increased coloring material's density in the vicinity of the record medium's surface, embedding to the record medium may be bettered, preparing the printed matter with high chroma. Especially, the above effect is remarkable for the plain paper where the difference between the chroma of the record medium and the chroma of the coloring material is great.

Most of the coloring materials and most of the cationic fine particles may individually react with the ion and the salt, may individually aggregate due to pH change, thus forming the multilayer structure. The coloring material may also aggregate and fix, thus bringing about an excellent printed matter in terms of water resistance, light resistance, and fixing property.

Moreover, in the above range, the dispersion state of the cationic fine particle may be bettered, thus preferably keeping the treating liquid's properties including the storage stability and the discharge stability from the record head.

Still more preferable pH range is 3 to 6, where the corrosion of the record head attributable to a long time storage can be extremely effectively prevented, and the friction (or abrasion) resistance of the printed part may be further improved.

—Acid—

As described above, the treating liquid of the present invention preferably contains acid, with its pH adjusted to 2 to 7. The acid which is the secondary component may ionize the cationic fine particle's surface and thereby enhance the surface potential, thus improving the dispersion stability of the fine particle in the liquid, improving absorption property of the anionic compound (anionic coloring material) recording liquid and adjusting the viscosity of the treating liquid. As long as obtaining, in combination with the cationic fine particle used, properties such as preferred pH, preferred ζ potential and preferred fine particle dispersibility, the acid of the present invention is not specifically limited. The following inorganic acid, organic acid and the like can be arbitrarily selected.

Specifically, as the inorganic acids, for example, hydrochloric acid, sulfuric acid, sulfurous acid, nitric acid, nitrous acid, phosphoric acid, boric acid, carbonic acid and the like can be raised; and as the organic acids, for example, the following carboxylic acids, sulfonic acids, amino acids and the like can be raised.

Examples of the carboxylic acid include formic acid, acetic acid, chloro acetic acid, dichloro acetic acid, trichloro acetic acid, fluoro acetic acid, trimethyl acetic acid, methoxy acetic acid, mercapto acetic acid, glycolic acid, propionic acid, butyric acid, valerianic acid, caproic acid, caprylic acid, capric acid, lauric acid, myristic acid, palmitic acid, stearic acid, oleic acid, linoleic acid, linolenic acid, cyclohexane carboxylic acid, phenyl acetic acid, benzoic acid, o-toluic acid, m-toluic acid, p-toluic acid, o-chloro benzoic acid, m-chloro benzoic acid, p-chloro benzoic acid, o-bromo benzoic acid, m-bromo benzoic acid, p-bromo benzoic acid, o-nitro benzoic acid, m-nitro benzoic acid, p-nitro benzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxy benzoic acid, anthranilic acid, m-amino benzoic acid, p-amino benzoic acid, o-methoxy benzoic acid, m-methoxy benzoic acid, p-methoxy benzoic acid and the like.

Examples of the sulfonic acids include benzene sulfonic acid, methyl benzene sulfonic acid, ethyl benzene sulfonic acid, dodecyl benzene sulfonic acid, 2,4,6-trimethyl benzene sulfonic acid, 2,4-dimethyl benzene sulfonic acid, 5-sulfo salicylic acid, 1-sulfo naphthalene, 2-sulfo naphthalene, hexane sulfonic acid, octane sulfonic acid, dodecane sulfonic acid and the like.

Examples of the amino acids include glycine, alanine, valine, α-amino butyric acid, γ-amino butyric acid, β-alanine, taurine, serine, ε-amino-n-caproic acid, leucine, norleucine, phenyl alanine and the like.

For the treating liquid of the present invention, the above can be used alone or in combination of two or more. Among the above, those having a primary dissociation constant pKa of 5 or less in water of the acid can be preferably used, since being especially excellent in the dispersion stability of the cationic fine particle and in the absorption property of the anionic compound. Specifically, hydrochloric acid, nitric acid, sulfuric acid, phosphoric acid, acetic acid, formic acid, oxalic acid, lactic acid, citric acid, maleic acid, malonic acid and the like can be raised.

Of the present invention, mixture ratio of the cationic fine particle (A) relative to the acid (B) in treating liquid is, based on mass, preferably A:B=200:1 to 5:1, more preferably 150:1 to 8:1, in view of improved dispersion stability of the cationic fine particle and improved absorption property of the anionic compound to the fine particle's surface.

—Other Structural Component—

Hereinafter specifically described is other component of the cationic treating liquid. The cationic treating liquid of the present invention contains, as its necessary component, the above cationic fine particle, preferably contains the above acid, and further contains ordinarily water as liquid medium, moreover, may contain water-soluble organic solvent and other additives.

Examples of the above water-soluble organic solvents include: amides such as dimethyl formamide, dimethyl acetamide and the like; ketones such as acetone and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, triethylene glycol, 1,2,6-hexane triol, thiodiglycol, hexylene glycol, diethylene glycol and the like; low alkyl ethers of polyvalent alcohol such as ethylene glycol methyl ether, diethylene glycol monomethyl ether, triethylene glycol monomethyl ether and the like; monovalent alcohols such as ethanol, isopropyl alcohol, n-butyl alcohol, iso butyl alcohol and the like; glycerin; N-methyl-2-pyrrolidone; 1,3-dimethyl-imidazolidinone; triethanol amine; sulfolane; dimethyl sulfooxide; and the like. Content of the above water-soluble organic solvent is not specifically limited, preferable examples thereof including 5% by mass to 60% by mass of total treating liquid mass, moreover, 5% by mass to 40% by mass.

Moreover, the treating liquid of the present invention may be properly blended, when necessary, with additives such as viscosity controlling agent, pH preparing agent, antiseptic, fungicide, various surfactants, oxidation inhibitor, rust preventive, evaporation promoter, water-soluble cationic compound, binder resin and the like. Selection of the surfactant is especially important for adjusting the permeability of the treating liquid into the record medium. For further imparting the cationic property to the treating liquid or for other purposes, the water-soluble cationic compound can be arbitrarily selected as long as the operation and effect of the present invention are not damaged.

For further improving the friction (or abrasion) resistance of the cationic fine particle or for other purposes, the binder resin may be used in combination, as long as the record medium's texture and the treating liquid's storage stability and discharge stability are not damaged. For example, the selection can be arbitrarily made from water-soluble polymer, emulsion, latex and the like.

The treating liquid of the present invention is more preferred to be, colorless or white, otherwise can be toned in its color according to the color of the record medium. Moreover, preferable viscosity of the above treating liquid is 1 mPa·s (cP) to 30 mPa·s (cP), more preferably 2 mPa·s to 25 mPa·s, still more preferably 3 mPa·s to 20 mPa·s. The treating liquid having the low surface tension can bring about higher-image-quality printed matter, especially with higher viscosity to a certain extent.

Though the reason therefor is not clarified, at least the following inference is made. The present invention is, however, not limited by the following inference.

The higher the viscosity of the treating liquid is to a certain extent, the permeation rate in the perpendicular direction (relative to the record medium) is suppressed to a certain extent. In this case, the liquid droplet with low surface tension may be smashed and thereby spread horizontally relative to the record medium in the vicinity of the record medium's surface. As a result, the treating liquid can be better embed and fix. With this, the treating liquid can favorably prevent permeation of the recording liquid, thus bringing about the higher-image-quality printed matter.

On the other hand, too high a viscosity may make it difficult to secure discharge stability of the treating liquid. Moreover, in this case, the permeability of the treating liquid may be deteriorated, and thereby the embedding may be worsened, thus high image quality is less likely to be brought about to the printed matter. In sum, the viscosity is preferred to be low to such an extent that the treating liquid is higher than the recording liquid in terms of permeability.

The treating liquid can be prepared by dispersing a component (reactive with the coloring material) in the vehicle having water as its main component. When the above component (reactive with the coloring material) is a fine particle, peptisation agent is preferably used for stabilizing the dispersion of the fine particle. Forming electric double layers on the surface of a charged particle, the peptisation agent can stabilize the dispersion by preventing approach of the particle with the electric double layers electrostatically repulsed. With the fine particle charged positive from neutral to acid, the following peptisation agents can be used: anion sources such as acetic acid, nitric acid, hydrochloric acid, formic acid, lactic acid, and alkali metal salt thereof; zirconium compound such as oxychlorinated zirconium hydrate and the like; sodium pyrophosphate; sodium hexametaphosphate; taurine; and the like. The present invention is, however, not limited thereto.

The treating liquid of the present invention can be manufactured by the following method.

When the component reactive with the coloring material is water-soluble, the treating liquid can be prepared by being dissolved in the solvent having water as its main component. When the component reactive with the coloring material is the fine particle, the fine particle, water and the peptisation agent are to be mixed for preparing the dispersion liquid. When necessary the water-soluble solvent is to be added, followed by peptisation with a peptisating machine. Examples of the peptisating machine used herein include high-speed and high-shear stirring-peptisating machine, dissolver, colloid mill, homogenizer, ultrasonic peptisating machine, and the like. Specifically, T.K. auto homo mixer, T.K. homomic line flow, ultra homo mixer, NNK colloid mill, and the like. The peptisation speed may vary with type and structure of the peptisating machine, preferably 500 rpm to 10000 rpm, more preferably 2000 rpm to 8000 rpm. Peptisation temperature is preferably 5° C. to 100° C. Peptisation time may vary with type and structure of the peptisating machine, preferably 0.01 hour to 68 hours.

Of the above inorganic fine particles, the cationic colloidal silica is especially preferable. Of the inorganic fine particles, the cationic colloidal silica has especially high reactivity with the coloring material. An ink set having a combination of the treating liquid (using the cationic colloidal silica) and the recording liquid can bring about still higher image quality.

—Surfactant—

The treating liquid of the present invention can contain a surfactant. The surfactant has such operations as decreasing the surface tension, enhancing the dispersion stability of the component reactive with the coloring material, and enhancing the reactivity when the two liquids contact. Preferable surfactant contained in the treating liquid is a compound which is different in polarity from the coloring material, or a nonionic compound.

When the recording liquid is anionic, the cationic surfactants such as quaternary ammonium salt, pyridinium salt, imidazoline compound and the like may be used for the cationic compound. Specifically, lauryl trimethyl ammonium chloride, lauryl dimethyl benzil ammonium chloride, benzil tributyl ammonium chloride, benzalkonium chloride, cetyl pyridinium chloride, 2-hepta decenyl hydroxy ethyl imidazoline and the like can be raised.

Moreover, a penetrant can improve wettability of the treating liquid and the record medium, and is added for adjusting the permeation rate. As the penetrant, those expressed by the following formula (I) to formula (IV) are preferable.

Specifically, polyoxy ethylene alkyl phenyl ether surfactant expressed by the formula (I), acetylene glycol surfactant expressed by the formula (II), polyoxy ethylene alkyl ether surfactant expressed by the formula (III), and polyoxy ethylene polyoxy propylene alkyl ether surfactant expressed by the formula (IV). The above surfactants can decrease surface tension of the liquid, thus improving wettability and enhancing permeation rate.

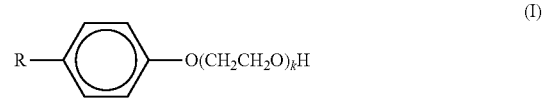

(R is a hydrocarbon chain having 6 to 14 branchable carbons, k: 5 to 20)

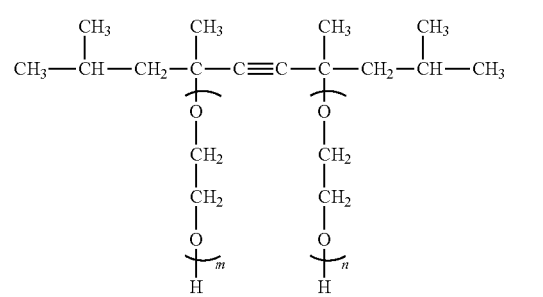

(m, n: 0 to 40)

$$R-(OCH_2CH_2)_nH \quad (III)$$

(R is a hydrocarbon chain having 6 to 14 branchable carbons, and n is 1 to 20)

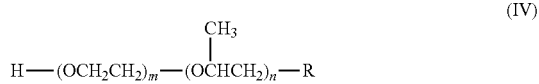

(IV)

(R is a hydrocarbon chain having 6 to 14 carbons, and m and n each are 20 or less)

Examples of penetrants other than the compounds in the above formula (I) to formula (IV) include: alkyl and aryl ethers of polyvalent alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether and the like; nonionic surfactants such as polyoxy ethylene polyoxy propylene block copolymer and the like; fluoro surfactant; low alcohols such as ethanol, 2-propanol and the like. Especially preferable is diethylene glycol monobutyl ether.

Of the above surfactants to be added to the above treating liquid, those charged same in polarity with the contained component is preferable. When the cationic colloidal silica having high aggregation effect with the coloring material is adopted for the fine particle, the cationic compound is preferable.

Specific examples as the above cationic compounds include cationic surfactants such as quaternary ammonium salt, pyridinium salt, imidazoline compound and the like. More specifically, lauryl trimethyl ammonium chloride, lauryl dimethyl benzil ammonium chloride, benzil tributyl ammonium chloride, benzalkonium chloride, cetyl pyridinium chloride, 2-hepta decenyl hydroxy ethyl imidazoline and the like can be raised.

Moreover, as the cationic surfactant, commercially available cation G50 (made by Sanyo Chemical Industries, Ltd.) and the like can be used.

Moreover, a cationized amphoteric surfactant can be used. In this case, however, the treating liquid is to have its pH less than or equal to an isoelectric point of the cationized amphoteric surfactant. Of the amphoteric surfactants, those having the isoelectric point close to the pH of the mixture is especially preferable, since they can decrease the dispersion stability of the fine particle when the mixture is made.

Specific examples of the amphoteric surfactant include amino acid amphoteric surfactant and $RNHCH_2$—$CH_2COOH$ type compound, that is, betaine type compound such as stearyl dimethyl betaine, lauryl dihydroxy ethyl betaine and the like. The amphoteric surfactants of the present invention are, however, not limited thereto.

The cationic surfactant is effective for improving the image for the following operations: i) rapidly forming the fine particle layer with the wettability (with the record medium) enhanced by decreasing the surface tension, and ii) aggregating the anionic coloring material.

(Recording Liquid)

A recording liquid of the present invention comprises: a coloring agent, and a component having a reactivity with a component in a treating liquid. The treating liquid of the present invention further comprises a fine particle, a base, and when necessary, other components.

The coloring material used for the recording liquid of the present invention may be any of dye and pigment. When the fine particle is cationic, however, in view of the image improvement, any of the anionic dye and the anionic pigment is preferable, since they can be electrically neutralized to be followed by the aggregation. The pigment is more preferable than the dye. Specifically, when electrically neutralized, the pigment in the dispersion state can more efficiently cause the aggregate than the dye in the dissolution state, thus effectively improving the image quality.

Examples of the pigment include i) as organic pigment: azo, phthalocyanine, anthraquinone, quinacridone, dioxadine, indigo, thioindigo, perylene, isoindolenone, aniline black, azo methyne, rhodamine B lake pigment, carbon black and the like; and ii) as inorganic pigment: iron oxide, titanium oxide, calcium carbonate, barium sulfate, aluminum hydroxide, barium yellow, iron blue, cadmium red, chromium yellow, metal powder, and the like.

Examples of the pigment dispersant having the anionic group include polyacrylic acid, polymethacrylic acid, styrene acrylic resin, styrene maleic acid resin, water-soluble vinyl naphthalene acrylic resin, water-soluble vinyl naphthalene maleic acid resin, formalin β-naphthalene sulfonate condensation product, carboxy methyl cellulose, starch glycolic acid, sodium alginate, pectic acid, hyaluronic acid, and the like. The above anionic dispersants may be used in a form of acid. Otherwise, alkali metal salts such as sodium and potassium are also usable.

The recording liquid's component reactive with the treating liquid's component may be any of the inorganic matter, the organic matter, and the complex (organic and inorganic) matter. Furthermore, the recording liquid's component may be any of the fine particle, the monomer and the polymer resin, being advantageous over the prior art. The recording liquid's component is preferred to be different from the treating liquid's component in terms of polarity, especially preferred to be anionic.

Moreover, for enhancing properties other than the reactivity such as viscosity adjustment, pH adjustment, surface tension adjustment, the nonionic component can also be contained. Moreover, the recording liquid's component reactive with the treating liquid's component may be the coloring material.

Of the present invention, specific examples of the anionic polymers added to the recording liquid include low molecular anionic materials having molecular weight of 1000 or less, preferably 100 to 700. Specific examples are shown below, but not limited thereto:

Disodium lauryl sulfosuccinate, disodium polyoxy ethylene lauroyl ethanol amide ester sulfosuccinate, disodium polyoxy ethylene alkyl sulfosuccinate, carboxylic polyoxy ethylene lauryl ether sodium salt, carboxylic polyoxy ethylene lauryl ether sodium salt, carboxylic polyoxy ethylene tridecyl ether sodium salt, sodium polyoxy ethylene lauryl ether sulfate, polyoxy ethylene lauryl ether sulfuric acid triethanol amine, sodium polyoxy ethylene alkyl ether sulfate, sodium polyoxy ethylene alkyl ether sulfate, sodium alkyl sulfate, alkyl sulfuric acid triethanol amine and the like.

As described above, low molecular anionic compounds are exemplified. The compounds used in the present invention are not limited thereto.

Moreover, as another example, a monomer of an after mentioned anionic high molecular component or an oligomer of the after mentioned anionic high molecular component can be use used.

Next, the operation and effect of the present invention when the anionic high molecular material has its peak of the molecular weight distribution in a range from 1500 to 10000 can be summarized as follows: As the second step of the reaction between the treating liquid and the ink, an associate body of i) the coloring material and ii) the low molecular component of the anionic material is to be absorbed into the molecule, the aggregate of the dye caused in the association is to be further enlarged, and thereby the aggregate becomes less likely to enter the gap between fibers of the record paper. With this, it is only the liquid part of the solid-liquid separation that can be oozed in the record paper, thus accomplishing both of the print quality and the fixing property (compatible).

Specific examples of the anionic high molecule preferably used in the present invention include alkali-soluble high molecules, as described below.

Specifically, copolymers and salts of the following: i) hydrophobic monomers such as styrene, styrene derivative, vinyl naphthalene, vinyl naphthalene derivative, alkyl ester of acrylic acid, alkyl ester of methacrylic acid; and ii) hydrophilic monomers such as $\alpha,\beta$-ethylene unsaturated carboxylic acid (and aliphatic alcohol ester thereof), acrylic acid, methacrylic acid, maleic acid, itaconic acid, fumaric acid, derivatives thereof, and the like.

The copolymer may have any of the structures such as random, block, graft and the like.

Moreover, another specific example of the anionic high molecule includes polystyrene sulfonic acid and the like, but not limited thereto.

Still another specific example includes a compound which is a copolymerization of nonionic monomer and anionic monomer.

Moreover, the above described high molecular materials and the anionic high molecular materials are preferred to be water-soluble, but dispersoids such as latex and emulsion may also usable.

—Anionic Fine Particle—

Described next is the component of the recording liquid of the present invention. The anionic fine particle raised as the primary component is preferred to have an anionized surface of the particle itself when dispersed in the treating liquid, so as to accomplish the operation and effect described above. This anionized surface can absorb the cationic component to the particle surface when the recording liquid contacts the treating liquid, thus suppressing an excessive permeation of the coloring material into the record medium. With this, an ink jet recorded image with a sufficient image density can be obtained.

Contrary to the above, when the fine particle's surface is not anionic and is present separately, in the treating liquid, from the water-soluble anionic compound, the coloring material may aggregate around the anionic compound, thereby damaging the coloring property of the coloring material itself, thus making it difficult to accomplish the coloring property as good as that of the ink jet coat paper. With this, the fine particle used in the treating liquid of the present invention is to have its surface anionized. However, an essentially anionic fine particle is usable, as a matter of course. Also usable is a fine particle which is electrostatically cationic or neutral in nature, but can have its surface anionized through treatment.

On the record medium, the anionic fine particle causes the aggregate that is formed with small holes. Herein, formation of the small holes is sufficient for accomplishing the object of the present invention, and therefore the material for the fine particle is not specifically limited. Specific examples include silica, titania, zirconia, boria, silica boria, ceria, magnesia, silica magnesia, calcium carbonate, magnesium carbonate, zinc oxide and the like all of which are anionized; furthermore including inorganic fine particle, organic fine particle, complex (inorganic and organic) fine particle and the like of the above. In addition, for the treating liquid of the present invention, the above can be used alone or in combination of two or more.

Moreover, like the above cationic fine particle, and from the viewpoint of recording liquid's after-print coloring property, color evenness and storage stability after printing, the anionic fine particle of the present invention is preferred to have its average particle diameter of 0.005 μm to 1 μm measured by a dynamic light scattering method. More preferably, the average particle diameter is 0.01 μm to 0.8 μm. Use of the above fine particle can bring about an especially preferable friction (or abrasion) resistance and texture after printing to the record medium. More preferably, the average particle diameter is 0.03 μm to 0.3 μm. The particle of this diameter is preferable since the small hole of the fine particle aggregate formed on the record medium can be effectively formed on a small hole radius area in target.

Moreover, the above anionic fine particle of the present invention has a purpose of efficiently forming the small hole of the fine particle aggregate formed on the record medium, and simultaneously with this, efficiently absorbing the coloring material to the surface of the fine particle itself. For the above purpose, the fine particle is preferred to have its maximum small hole radius of 2 nm to 12 nm by a nitrogen absorbing-dissociating method, with a total small hole capacity of 0.3 ml/g or more. More preferably, the maximum small hole radius of the fine particle is 3 nm to 10 nm, with the total small hole capacity of 0.3 ml/g or more, since the small hole of the fine particle aggregate formed the record medium can be effectively formed in the small hole radius area in target.

The above fine particle is preferred to have BET (Brunauer-Emmett-Teller) specific surface of 70 $m^2$/g to 300 $m^2$/g, thus causing sufficient absorption points of the coloring material to the fine particle's surface. With this, the coloring material can be effectively left in the vicinity of the surface of the record medium in a single molecular state, contributing to the improvement of the coloring property.

Moreover, the shape of the fine particle of the present invention can be measured by dispersing the fine particle in the ion-exchange water and dropping it on the collodion film for preparing a measurement sample, and then observing it with a transmittance-type electronic microscope. Of the present invention, the small hole is formed in the fine particle aggregate when the fine particle aggregate is formed on the record medium. In terms of this, the following shapes of the fine particle can be preferably used: i) needle, ii) flat plate, iii) asphericity such as rod and necklace having a spherical primary particle forming a secondary particle connected thereto with a certain orientation. According to the present inventors, the flat plate has better dispersibility in water than the needle, thus causing a random orientation when the fine particle aggregate is formed and thereby making the small hole capacity big, which is preferable.

Content of the above anionic fine particle in the treating liquid can be properly determined based on the type of the material to be used. In this case, however, 0.1% by mass to 40% by mass is preferable for accomplishing the object of the present invention, more preferably 1% by mass to 30% by mass, still more preferably 3% by mass to 15% by mass. In the above ranges, an excellent coloring image can be obtained irrespective of paper type, and the treating liquid is especially excellent in storage stability and discharge stability.

The recording liquid of the present invention may contain the fine particle having in its surface the anionic group. Preferably, the fine particle is stably dispersed, moreover, contains base, pH is adjusted to 7 to 12, the $\zeta$ potential is $-5$ mV to $-90$ mV.

Hereinafter described is the $\zeta$ potential of the recording liquid. At first described is a principle of the $\zeta$ potential. Generally, in a system where the solid is dispersed in the liquid, with the free electric charge present in the surface of the solid phase, an inversely charged layer may appear to the liquid phase in the vicinity of the solid phase interface, in such a manner as to keep electric neutrality. This is referred to as electric double layer, where a potential difference caused by the electric double layer is referred to as ζ potential. When the ζ potential is plus, the surface of the fine particle may be cationic, when minus it may be anionic. Generally, the higher the absolute value thereof is, the more strongly the electrostatic repulsion may act between the fine particles, which is a state of good dispersibility, simultaneously, a state where the ion property of the fine particle's surface is strong. In sum, the lower the ζ potential is, the more anionic the anionic fine particle becomes, that is, more strongly attracting the cationic compound in the treating liquid.

With the ζ potential of the above recording liquid in the range of −5 mV to −90 mV, the cationic compound (cationic coloring material) in the recording liquid can be especially efficiently absorbed to the surface of the anionic fine particle, showing an especially excellent coloring property on the record medium.

Though the reason therefor is not clarified, the progress of the aggregation can be inferred in the following manner. The present invention is, however, not limited by the following inference.

The fine particle having the above ζ potential has a proper anionic property. With this, when the anionic compound in the recording liquid contacts the cationic compound in the treating liquid, a rapid aggregation may occur to the interface, thus forming a thin aggregate layer. In this case, the aggregate layer may act as a filter that prevents, to a certain extent, permeation of the large-particle-diameter anionic compound such as the anionic coloring material in the recording liquid. With this, most of the large-particle-diameter anionic compounds may stay on the surface layer of the record medium, failing to permeate in-depth into the record medium. On the other hand, the aggregate layer may be a semitransparent film that allows transmittance of low molecular polyvalent metal compounds such as water and ion. In this case, the cationic fine particle may react with the ion and the salt, may aggregate due to pH change, thus further preventing the in-depth permeation of the coloring material into the record medium. As a result, the coloring material may stay in the vicinity of the surface, allowing the printed matter to have high image density and low back-through density. Moreover, the increased density of the coloring material in the vicinity of the record medium's surface can better the embedding to the record medium, thus preparing the printed matter having high chroma. The above is especially effective for the plain where the chroma of the paper record medium and the chroma of the coloring material have a great difference.

Most of the coloring materials, most of the anionic fine particles and most of the cationic fine particles may individually react with the ion and the salt transmitting through the semitransparent film, may individually aggregate due to pH change, thus forming the multilayer structure. With the coloring material that also aggregate and fix, the printed matter becomes excellent in water resistance, light resistance and fixing property.

Use of the recording liquid of the present invention can bring about coloring property as excellent as that of the ink jet coat paper, can cause a small amount of white mist and a small amount of color unevenness in the large-ink-adhesion amount image area (such as the shadow part and the solid print part), accomplishing an excellent color evenness. Moreover, compared with the coat paper, the recording liquid of the present invention has an extremely efficient coloring property, thereby can decrease adhesion amount of the cationic fine particle. With this, especially for the printing to the plain paper, the recording liquid of the present invention can bring about a good image which is excellent in friction (or abrasion) resistance of the printed part, without damaging the feeling of the paper.

With the ζ potential of the anionic fine particle which can be contained in the recording liquid more than −5 mV, the anionic fine particle cannot obtain the dispersion stability. In this case, with the reactivity with the cationic component being weak, high image quality cannot be brought about to the printed matter. Less than −90 mV hereinabove may increase the dispersion stability too much, thus weakening the aggregate reactivity of the fine particle alone which reactivity is caused by the contact with the treating liquid, thus failing to obtain the high image quality.

In a more preferable ζ potential, for example, use of the treating liquid containing the anionic fine particle having the ζ potential of −10 mV to −85 mV may make the boundary between dots unremarkable in the solid printing, thus bringing about a good image having further decreased stripe unevenness by the head scan. Moreover, use of the treating liquid containing the anionic fine particle with its ζ potential of −15 mV to −65 mV can bring about an image having an extremely excellent coloring property, irrespective of the paper type.

From the viewpoint of the storage stability and the cationic compound's absorption property, the recording liquid of the present invention is preferred to have its pH containing base and in a range of 7 to 12 around 25° C. Use of the treating liquid of the above pH range can prepare the high-image-quality printed matter. Although the reason therefor is not clarified, the progress of the aggregation can be inferred in the following manner. The present invention is, however, not limited by the following inference.

Use of the recording liquid having the above range of pH 7 to 12 can remarkably decrease the stability of the cationic compound on the interface upon contact with the cationic treating liquid, thus forming the semitransparent film of thin aggregate layer to which the anionic compound and cationic compound are absorbed.

Most of the coloring materials can be blocked with the above semitransparent film, and thereby stays relatively on the surface of the record medium, failing to make the in-depth permeation.

Moreover, bases such as hydroxide ion, anion, low molecular salt in the recording liquid may transmit through the semitransparent film of the aggregate layer, thus allowing the cationic compound alone (in the treating liquid) to aggregate. As a result, the permeation of the coloring material can be further prevented, and thereby the coloring material can be present with high is density in the vicinity of the surface, thus bringing about the printed matter with high image density and low back-through density. Moreover, with the increased coloring material's density in the vicinity of the record medium's surface, embedding to the record medium may be bettered, preparing the printed matter having high chroma. Especially, the above effect is remarkable for the plain paper where the difference between the chroma of the record medium and the chroma of the coloring material is great.

Most of the coloring materials and most of the cationic fine particles may individually react with the ion and salt, may individually aggregate due to pH change, thus forming the multilayer structure. The coloring material may also aggregate and fix, thus bringing about the printed matter excellent in terms of water resistance, light resistance and fixing property.

Moreover, in the above range, the dispersion state of the anionic fine particle may be bettered, thus preferably keeping the treating liquid's properties including the storage stability and the discharge stability from the record head.

Still more preferable pH range is 8 to 11, where the corrosion of the record head attributable to a long time storage can be extremely effectively prevented, and the friction (or abrasion) resistance of the printed part may be further improved.

—Base—

The recording liquid of the present invention is preferred to contain the base, with its pH adjusted to 7 to 12. The base can improve the dispersion stability in the liquid by ionizing the surface of the anionic fine particle and by enhancing the surface potential. Moreover, the base may improve the absorption property of the anionic compound (anionic coloring material) in the recording liquid and adjust the viscosity of the recording liquid. As long as obtaining, in combination with the anionic fine particle to be used, desired properties such as pH, $\zeta$ potential and fine particle dispersibility, the base preferably used in the present invention is not specifically limited. Selection can be arbitrarily made from the following inorganic compound and organic compound.

Specifically, alkanol amines such as: sodium hydroxide, lithium hydroxide, sodium carbonate, ammonium carbonate, ammonia, sodium acetate, ammonium acetate, morpholine, monoethanol amine, diethanol amine, triethanol amine, ethyl monoethanol amine, normal butyl monoethanol amine, dimethyl ethanol amine, diethyl ethanol amine, ethyl diethanol amine, normal butyl diethanol amine, dinormal butyl ethanol amine, monoisopropanol amine, diisopropanol amine, and triisopropanol amine. Among the above, especially, the base having its primary dissociation constant pKb of 5 or less in water is preferably used since it is especially excellent in the dispersion stability of the anionic fine particle and in the absorption property of the cationic compound (cationic coloring material).

Of the present invention, mixture ratio of the anionic fine particle (A) relative to the base (B) in the recording liquid is preferably A:B=200:1 to 5:1, more preferably 150:1 to 8:1, in view of excellent dispersion stability of the anionic fine particle and excellent absorption property of the cationic compound to the fine particle's surface.

—Other Structural Component—

Hereinafter specifically described is other structural component of the recording liquid. The recording liquid of the present invention can contain the above anionic fine particle, preferably, the above base, and further may contain ordinarily water as liquid medium, moreover, may contain water-soluble organic solvent and other additives. Examples of the other additives to be properly blended include defoaming agent, viscosity controlling agent, pH preparing agent, antiseptic, various surfactants, oxidation inhibitor, evaporation promoter, water-soluble anionic compound, binder resin and the like.

The recording liquid of the present invention has various properties with preferable range: surface tension of 10 mN/m (dyn/cm) to 60 mN/m (dyn/cm), more preferably 10 mN/m (dyn/cm) to 40 mN/m (dyn/cm), and viscosity of 1 mPa·s (cP) to 30 mPa·s (cP).

(Process of Manufacturing Recording Liquid)

The process of manufacturing the above recording liquid of the present invention containing the fine particle may be selected from those used generally for dispersion. Specifically, for obtaining the above range of average particle diameter and grain size distribution of the fine particle in the recording liquid, dispersing machines such as roll mill, sand mill, homogenizer, ultrasonic homogenizer, ultra high pressure emulsifier (for example, branded as Nanomizer and the like) and the like are to be used, in combination with classification by means of centrifugal separation, ultrafiltration and the like. The above treatment units can arrange the dispersion particle diameter of the fine particles in the recording liquid.

—Coloring Material—

Hereinafter described is the aqueous anionic recording liquid constituting the ink set of the present invention, in combination with the above cationic treating liquid. The ink set is defined, herein, as a combination of the treating liquid of the present invention with the recording liquid containing the anionic material (anionic coloring material).

When the water-soluble dye which contains the anionic group is used as the coloring material or when the pigment is used as the coloring material, the anionic recording liquid of the present invention is preferred to be combined with the anionic compound (this is also referred to as anionic coloring material of the present invention). The above anionic coloring material-containing ink of the present invention may further contain, when necessary, water, water-soluble organic solvent and other component (for example, defoaming agent, viscosity controlling agent, pH preparing agent, antiseptic, surfactant, oxidation inhibitor and the like). Hereinafter described is each structural component of the ink.

—Water-Soluble Dye—

As long as being the water-soluble acid dye, the direct dye and the reactivity dye which are described in the Color Index, the water-soluble dye having the anionic group of the present invention is not specifically limited. Even when not described in the Color Index, those having the anionic group such as sulfone group, carboxyl group and the like can be used: Some of the water-soluble dyes have pH dependence of solubility.

—Pigment—

As another mode of the aqueous anionic coloring material-containing ink, namely, in place of the above water-soluble dye having the anionic group, pigment and anionic compound can be used for the ink. When necessary, the ink may contain water, water-soluble organic solvent and other component (such as viscosity controlling agent, pH preparing agent, antiseptic, surfactant, oxidation inhibitor and the like). Herein, the anionic compound may be the dispersant of the pigment; or in the case that the dispersant of the pigment is not anionic, an anionic compound other than the dispersant may be added. As a matter of course, even in the case that the dispersant of the pigment is anionic compound, still another anionic compound may be added. Especially, the dispersant that is an anionic pigment allows the recording liquid to have high reactivity with the treating liquid, thus bringing about the higher-image-quality printed matter.

Of the present invention, the following pigments are preferably usable, not specifically limited thereto: examples of carbon blacks used for black pigment ink include those manufactured by furnace method and channel method, preferably, with the primary particle diameter of 15 μm to 40 μm, specific surface of 50 $m^2/g$ to 300 $m^2/g$ by BET method, DBP oil absorption amount of 40 ml/100 g to 150 ml/100 g, volatility of 0.5% by mass to 10% by mass, and pH of 2 to 9.

Specific examples thereof selected from those commercially available include No. 2300, No. 900, MCF88, No. 40, No. 52, MA7, MA8, No. 2200B (made by Mitsubishi Chemical Corporation.), RAVEN 1255 (made by Columbia), REGAL 400R, REGAL 660R, MOGUL L (made by Cabot Corporation), Color Black FW 1, Color Black FW 18, Color Black S170, Color Black S150, Printex 35, Printex U (made by Degussa AG) and the like. Moreover, those newly made as prototype of the present invention can also be used.

Examples of the pigments used for the yellow ink include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83 and the like.

Examples of the pigments used for the magenta ink include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112, C.I. Pigment Red 122 and the like.

Examples of the pigments used for the cyanogen ink include C.I. Pigment Blue 1, C.I. Pigment Blue 2, C.I. Pigment Blue 3, C.I. Pigment Blue 15: 3, C.I. Pigment Blue 16, C.I. Pigment Blue 22, C.I. Vat Blue 4, C.I. Vat Blue 6 and the like. The coloring materials of any of the colors described above may also those newly manufactured for the present invention.

—Self-Dispersion Pigment—

Moreover, the pigment usable for the anionic ink may be the self-dispersion pigment that can be dispersed in water or aqueous medium without the dispersant. The self-dispersion pigment has a pigment surface to which at least one anionic hydrophilic group is coupled directly or via other atomic group. Examples of the anionic hydrophilic group include at least one selected from the following hydrophilic groups. Examples of the other atomic group include i) alkylene group having 1 to 12 carbon atoms, ii) phenylene group capable of having substituent, and iii) naphthylene group capable of having substituent.

—COOM, —SO$_3$M, —SO$_2$NH$_2$, —PO$_3$HM, —PO$_3$M$_2$
(where M in the above formulas denotes hydrogen atom, alkali metal, ammonium, or organic ammonium.)

As described above, the pigment charged anionic by incorporating the hydrophilic group into the pigment surface may have an excellent water dispersibility attributable to the ion's repulsion, thereby keeping the stable dispersion state even when being contained in the colored ink, without addition thereto of dispersant and the like. Especially, the pigment being carbon black is preferable.

Moreover, examples of the above water-soluble dye include those classified, in the Color Index, as acid dye, direct dye, basic dye, reactive dye and edible dye (food color) all of which are excellent in water resistance and light resistance. The above dyes may be used in combination, or, when necessary, may be mixed with other pigment. The above coloring materials may be added as long as the effect of the present invention effect is not damaged.

(a) The following acid dyes and edible dyes (food colors) are preferable.

C.I. acid yellow 17, 23, 42, 44, 79, 142
C.I. acid red 1, 8, 13, 14, 18, 26, 27, 35, 37, 42, 52, 82, 87, 89, 92, 97, 106, 111, 114, 115, 134, 186, 249, 254, 289
C.I. acid blue 9, 29, 45, 92, 249
C.I. acid black 1, 2, 7, 24, 26, 94
C.I. food yellow 3, 4
C.I. food red 7, 9, 14
C.I. food black 1, 2

(b) The following direct dyes are preferable.

C.I. direct yellow 1, 12, 24, 26, 33, 44, 50, 86, 120, 132, 142, 144
C.I. direct red 1, 4, 9, 13, 17, 20, 28, 31, 39, 80, 81, 83, 89, 225, 227
C.I. direct orange 26, 29, 62, 102
C.I. direct blue 1, 2, 6, 15, 22, 25, 71, 76, 79, 86, 87, 90, 98, 163, 165, 199, 202
C.I. direct black 19, 22, 32, 38, 51, 56, 71, 74, 75, 77, 154, 168, 171

(c) The following basic dyes are preferable.

C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91
C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112
C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155
C.I. basic black 2, 8

(d) The following reactivity dyes are preferable.

C.I. reactive black 3, 4, 7, 11, 12, 17
C.I. reactive yellow 1, 5, 11, 13, 14, 20, 21, 22, 25, 40, 47, 51, 55, 65, 67
C.I. reactive red 1, 14, 17, 25, 26, 32, 37, 44, 46, 55, 60, 66, 74, 79, 96, 97
C.I. reactive blue 1, 2, 7, 14, 15, 23, 32, 35, 38, 41, 63, 80, 95.

—Pigment Dispersant—

The dispersant of the pigment used for the ink of the present invention may be any kind of water-soluble resin, as long as the water-soluble resin is capable of stably dispersing the pigment in water or aqueous medium, by the presence of the anionic group. Especially, those having weight average molecular weight of 1,000 to 30,000 are preferable, more preferably 3,000 to 15,000. Specifically, examples thereof include hydrophobic monomer such as styrene, styrene derivative, vinyl naphthalene, vinyl naphthalene derivative, aliphatic alcohol ester of α,β-ethylene unsaturated carboxylic acid, and the like; and block copolymer, graft copolymer or random copolymer including two or more monomers selected from acrylic acid, acrylic acid derivative, maleic acid, maleic acid derivative, itaconic acid, itaconic acid derivative, fumaric acid and fumaric acid derivative (and salt thereof); and the like. The above dispersants are alkali-soluble resins soluble in a solution dissolving therein the base.

Moreover, the pigment dispersant may be homopolymer made of hydrophilic monomer, or salt thereof. Moreover, water-soluble resins such as polyvinyl alcohol, carboxy methyl cellulose, naphthalene sulfonic acid form aldehyde condensation product and the like are also usable. In this case, however, use of the alkali-soluble resin is advantageous, in terms of decreasing dispersion liquid viscosity and of easy dispersion. The above water-soluble resin is preferred to be 0.1% by mass to 5% by mass relative to the total ink amount.

The pigment ink of the present invention is made by dispersing or dissolving the above pigment and the above water-soluble resin in the water-soluble medium. The preferable aqueous medium for the pigment ink of the present invention is a mixture solvent of water and water-soluble organic solvent, the ion-exchange water (deionized water) being preferable instead of the general water containing various ions.

When the dispersant is not the anionic high molecule, the ink containing the above described pigment is preferred to be added by the anionic compound. Examples of the anionic compound preferably used in the present invention include the high molecular material such as the alkali-soluble resin explained in the description of the pigment dispersant. In addition, the following low molecular anionic surfactants can be raised.

—Surfactant—

Specific examples of the low molecular anionic surfactants include sulfo succinic acid lauryl disodium, sulfo succinic acid polyoxy ethylene lauroyl ethanol amide ester disodium, polyoxy ethylene alkyl sulfo succinic acid disodium, carboxylic polyoxy ethylene lauryl ether sodium salt, carboxylic polyoxy ethylene tridecyl ether sodium salt, sodium polyoxy ethylene lauryl ether sulfate, polyoxy ethylene lauryl ether sulfuric acid triethanol amine, sodium polyoxy ethylene alkyl ether sulfate, sodium alkyl sulfate, alkyl sulfuric acid triethanol amine and the like, but not limited thereto. Preferable use amount of the above anionic material is 0.05% by mass to 10% by mass, moreover, preferably 0.05% by mass to 5% by mass, relative to the total ink amount.

Moreover, penetrant may be added so as to improve the wettability of the treating liquid and the record medium, and to adjust the permeation rate. The preferable penetrants are those expressed by the following formula (I) to formula (IV). Specifically, polyoxy ethylene alkyl phenyl ether surfactant expressed by the formula (I), acetylene glycol surfactant expressed by the formula (II), polyoxy ethylene alkyl ether surfactant expressed by the following the formula (III), and polyoxy ethylene polyoxy propylene alkyl ether surfactant expressed by the formula (IV). Being capable of decreasing the surface tension of the liquid, the above surfactants can improve the wettability and enhance the permeation rate.

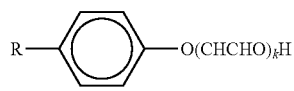

(I)

(R is a hydrocarbon chain having 6 to 14 branchable carbons, k: 5 to 20)

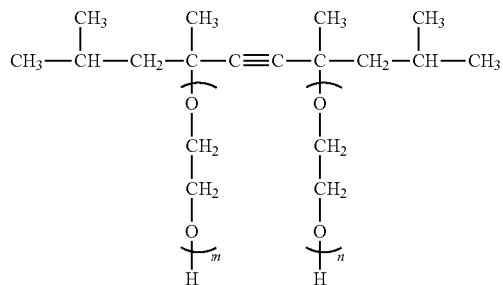

(II)

(m and n each are 0 to 40)

R—(OCH$_2$CH$_2$)$n$H  (III)

(R is a hydrocarbon chain having 6 to 14 branchable carbons, n is 1 to 20)

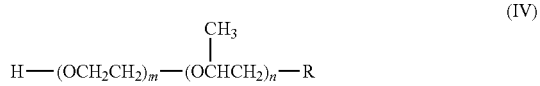

(IV)

(R is a hydrocarbon chain having 6 to 14 carbons, m and n each are 20 or less)

Examples of the surfactants other than the components of the above formula (I) to formula (IV) include:
alkyl and aryl ethers of polyvalent alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether and the like;

nonionic surfactants such as polyoxy ethylene polyoxy propylene block copolymer and the like; fluoro surfactant; low alcohols such as ethanol, 2-propanol; and the like. Especially preferable is diethylene glycol mono butyl ether.

Moreover, an anionized amphoteric surfactant can be used. In this case, however, the treating liquid is to have its pH less than or equal to an isoelectric point of the anionized amphoteric surfactant. Of the amphoteric surfactants, those having the isoelectric point close to the pH of the mixture is especially preferable, since they can decrease the dispersion stability of the fine particle when the mixture is made.

Specific examples of the amphoteric surfactant include amino acid amphoteric surfactant and RNHCH$_2$—CH$_2$COOH type compound, that is, betaine type compound such as stearyl dimethyl betaine, lauryl dihydroxy ethyl betaine and the like. The amphoteric surfactants of the present invention are, however, not limited thereto.

Hereinafter explained is about the recording liquid usable for the ink set of the present invention.

The coloring material used for the recording liquid of the present invention may be any of dye and pigment. When the fine particle is cationic, however, in view of the image improvement, any of the anionic dye and the anionic pigment is preferable, since they can be electrically neutralized to be followed by the aggregation. The pigment is more preferable than the dye. Specifically, when electrically neutralized, the pigment in the dispersion state can more efficiently cause the aggregate than the dye in the dissolution state, thus effectively improving the image quality.

Examples of the pigment used for the recording liquid of the ink set of the present invention include i) as organic pigment: azo, phthalocyanine, anthraquinone, quinacridone, dioxadine, indigo, thioindigo, perylene, isoindolenone, aniline black, azo methyne, rhodamine B lake pigment, carbon black and the like; and ii) as inorganic pigment: iron oxide, titanium oxide, calcium carbonate, barium sulfate, aluminum hydroxide, barium yellow, iron blue, cadmium red, chromium yellow, metal powder, and the like.

Examples of the pigment dispersant having the anionic group include polyacrylic acid, polymethacrylic acid, styrene acrylic resin, styrene maleic acid resin, water-soluble vinyl naphthalene acrylic resin, water-soluble vinyl naphthalene maleic acid resin, formalin β-naphthalene sulfonate condensation product, carboxy methyl cellulose, starch glycolic acid, sodium alginate, pectic acid, hyaluronic acid, and the like. The above anionic dispersants may be used in a form of acid. Otherwise, alkali metal salts such as sodium and potassium are also usable.

—Other Component—

Moreover, other than the components described above, for bringing about the recording liquid having a desired property, surfactant, defoaming agent, antiseptic and the like, when necessary, may be added to the recording liquid. Moreover, commercial water-soluble dye and the like can be added to the recording liquid.

Examples of the surfactants include: anionic surfactants such as fatty acid salts, high alcohol sulfuric acid ester salts, liquid fatty oil sulfuric acid ester salts, alkyl allyl sulfonates, and the like; and nonionic surfactants such as polyoxy ethylene alkyl ethers, polyoxy ethylene alkyl esters, polyoxy ethylene sorbitan alkyl esters, acetylene alcohol, acetylene glycol, and the like. The above surfactants are to be properly selected to be used alone or in combination. Their amount of use may vary with the amount of the added dispersant, preferably 0.01% by mass to 5% by mass relative to the total ink amount. In this case, the amount of the added surfactant is to be so determined as to allow the ink to have surface tension of 30 mN/m (dyn/cm) or more. With this, the ink jet recording method of the present invention can suppress the deviation of impact point of ink droplet and the like attributable to the wetting at the nozzle end.

Hereinafter described is a method of preparing the pigment ink described above. At first, the pigment is to be added to a solution containing at least resin and water for dispersing the pigment, followed by stirring, then followed by dispersion treatment using an after mentioned dispersion unit. When necessary, a centrifugal separation treatment is to be carried out, to thereby obtain a desired dispersion liquid. Then, the thus obtained dispersion liquid is added by the above component, then stirred, to thereby obtain the ink.

When the alkali-soluble resin is used, the base is to be added for dissolving the resin. In this case, the amount of the amine or the base for dissolving the resin is, one time or more the amount of the amine or the base resin which is calculated from the resin's acid value.

Carrying out a premixing for 30 minutes or more before dispersion treatment of the solution containing the pigment can better the dispersion efficiency of the pigment. This premixing can improve the wettability of the pigment surface, thus promoting the dispersant absorption to the pigment surface.

Preferable examples of the bases to be added to the dispersion liquid when using the alkali-soluble resin include organic amines such as monoethanol amine, diethanol amine, triethanol amine, amine methyl propanol, ammonia and the like; and inorganic bases such as potassium hydroxide, sodium hydroxide and the like.

On the other hand, the dispersing machine for preparing the pigment ink may be the one generally used, for example, ball mill, sand mill and the like. Above all, high-speed sand mill is preferable, for example, super mill, sand grinder, beads mill, agitator mill, grain mill, Dyno mill, Pearl mill, Cobol mill (commercially available) and the like.

—Organic Solvent—

Other than the above components, the ink of the present invention may be added, when necessary, by water-soluble organic solvent, surfactant, pH preparing agent, rust preventive, fungicide, oxidation inhibitor, evaporation promoter, chelating agent and water-soluble polymer, and the like.

The liquid medium for dissolving or dispersing the above coloring material of the present invention is preferred to be mixture of water and water-soluble organic solvent. Specific examples of the water-soluble organic solvent include: alkyl alcohols having 1 to 4 carbons such as methyl alcohol, ethyl alcohol, n-propyl alcohol, isopropyl alcohol, n-butyl alcohol, sec-butyl alcohol, tert-butyl alcohol and the like; amides such as dimethyl formamide, dimethyl acetamide and the like; ketones such as acetone and the like; ethers such as tetrahydrofuran, dioxane and the like; polyalkylene glycols such as polyethylene glycol, polypropylene glycol and the like; alkylene glycols with alkylene group having 2 to 6 carbon atoms such as ethylene glycol, propylene glycol, butylene glycol, triethylene glycol, 1,2,6-hexane triol, thiodiglycol, hexylene glycol, diethylene glycol and the like; low alkyl ethers of polyvalent alcohol such as glycerin, ethylene glycol monomethyl (or ethyl) ether, diethylene glycol monomethyl (or ethyl) ether and the like; cyclic amide compounds such as N-methyl-2-pyrrolidone, 1,3-dimethyl-2-imidazolidinone, sulfolane, dimethyl sulfooxide, 2-pyrrolidone, ε-caprolactam and the like; and imide compounds such as succinimide imide and the like; and the like.

Content of the above water-soluble organic solvent is, in general, preferably 1% by mass to 40% by mass relative to the total ink mass, more preferably 3% by mass to 30% by mass.

Moreover, content of water in the ink of 30% by mass to 95% by mass can bring about a good solubility and the like of the coloring material, preventing increase of the ink's viscosity, and sufficiently meeting the fixing property.

The anionic coloring material-containing ink of the present invention may be used for general aqueous writing tools, however, especially preferably used for the image recording method discharging the ink by ink's foaming phenomenon caused by heat energy, extremely stabilizing the discharge, and preventing satellite dot and the like. In this case, however, thermal property values (for example, specific heat, thermal expansion ratio, heat conductivity) are to be adjusted, as the case may be.

—Cationic Ink—

[Cationic Coloring Material-Containing Treating Liquid]

Hereinafter described is the treating liquid which contains the aqueous cationic coloring material. The treating liquid in combination with the recording liquid constitutes the ink set of the present invention. The cationic coloring material-containing treating liquid is defined, herein, as the treating liquid of present invention containing the cationic coloring material. Of the present invention, the cationic coloring material-containing treating liquid is categorized as the treating liquid. Moreover, the ink set of the present invention may be i) a combination of the recording liquid and the treating liquid, ii) a combination of the recording liquid and the cationic coloring material-containing treating liquid, and iii) a combination of the recording liquid, the treating liquid and the cationic coloring material-containing treating liquid. Moreover, the ink set of the present invention may be a combination of more than three components.

When the water-soluble dye which contains the cationic group is used as the coloring material or when the pigment is used as the coloring material, the cationic coloring material-containing treating liquid of the present invention is preferred to be combined with the cationic compound (this combination is also referred to as cationic coloring material of the present invention). The ink of the present invention may further contain, when necessary, water, water-soluble organic solvent and other component (for example, defoaming agent, viscosity controlling agent, pH preparing agent, antiseptic, surfactant, oxidation inhibitor and the like). Hereinafter described is each structural component of the cationic coloring material-containing treating liquid.

—Water-Soluble Dye—

As long as being the water-soluble dye described in the Color Index, the water-soluble dye having the cationic group of the present invention is not specifically limited. Even when not described in the Color Index, those having cationic group can be used. Some of the water-soluble dyes herein have pH dependence of solubility.

—Pigment—

As another mode of the cationic coloring material-containing treating liquid, namely, in place of the water-soluble dye having the above cationic group, pigment and cationic compound can be used for the treating liquid. When necessary, the treating liquid may contain water, water-soluble organic solvent and other component (such as viscosity controlling agent, pH preparing agent, antiseptic, surfactant, oxidation inhibitor and the like). Herein, the cationic compound may be a dispersant of the pigment; or in the case that the dispersant of pigment is not cationic, a cationic compound other than the dispersant may be added. As a matter of course, even in the case that the dispersant of the pigment is cationic compound, still another cationic compound may be added. The pigment of the present invention is not specifically limited, and therefore the pigment in the description of the anionic coloring material-containing ink can be preferably used.

—Pigment Dispersant—

The dispersant of the pigment used for the cationic coloring material-containing treating liquid of the present invention may be any kind of water-soluble resin, as long as the water-soluble resin is capable of stably dispersing the pigment in water or aqueous medium, by the presence of the cationic group. Specific examples thereof include those obtained by polymerization of vinyl monomer, at least a part of the polymer thus obtained being cationic. Examples of cationic monomer constituting the cationic part include the following tertiary amine monomer salts and quaternary compounds thereof.

Specifically described as below:
N,N-dimethyl amino ethyl methacrylate
    [$CH_2=C(CH_3)$—COO—$C_2H_4N(CH_3)_2$],
N,N-dimethyl amino ethyl acrylate
    [$CH_2=CH$—COO—$C_2H_4N(CH_3)_2$],
N,N-dimethyl amino propyl methacrylate
    [$CH_2=C(CH_3)$—COO—$C_3H_6N(CH_3)_2$],
N,N-dimethyl amino propyl acrylate
    [$CH_2=CH$—COO—$C_3H_6N(CH_3)_2$],
N,N-dimethyl acrylamide
    [$CH_2=CH$—$CON(CH_3)_2$],
N,N-dimethyl methacryl amide
    [$CH_2=C(CH_3)$—$CON(CH_3)_2$],
N,N-dimethyl amino ethyl acrylamide
    [$CH_2=CH$—$CONHC_2H_4N(CH_3)_2$],
N,N-dimethyl amino ethyl methacryl amide
    [$CH_2=C(CH_3)$—$CONHC_2H_4N(CH_3)_2$],
N,N-dimethyl amino propyl acrylamide
    [$CH_2=CH$—CONH—$C_3H_6N(CH_3)_2$],
N,N-dimethyl amino propyl methacryl amide
    [$CH_2=C(CH_3)$—CONH—$C_3H_6N(CH_3)_2$] and the like.

In the case of a tertiary amine, the compounds for forming the salt are hydrochloric acid, sulfuric acid, acetic acid and the like, the compounds for making quaternary are methyl chloride, dimethylsulfate, benzil chloride, epichloro hydrin and the like. Among the above, methyl chloride and dimethyl sulfate and the like are preferable for preparing the dispersant of the present invention. The above tertiary amine salt or the above quaternary ammonium compound may behave in water as cation, with the acidity falling in a stable dissolution range in a neutralized condition. Content of the monomer in the copolymer is preferably 20% by mass to 60% by mass.

Examples of other monomer used as the constituent of the above high molecular dispersant include 2-hydroxy ethyl methacrylate, acrylic acid ester having hydroxy group such as acrylic acid ester and the like having long-chain ethylene oxide chain in its side-chain; and hydrophobic monomers such as styrene monomer and the like, and water-soluble monomers which is soluble in water in the vicinity of pH 7 (acryl amides, vinyl ethers, vinyl pyrrolidones, vinyl pyridines, vinyl oxazolines). Examples of hydrophobic monomer include: hydrophobic monomers such as styrene, styrene derivative, vinyl naphthalene, vinyl naphthalene derivative, (meth)acrylic acid alkyl ester, acrylonitrile and the like. In the high molecular dispersant obtained by copolymerization, the water-soluble monomer is to be used at 15% by mass to 35% by mass for allowing the copolymer to be stably present in the solution, and the hydrophobic monomer is to be used at 20% by mass to 40% by mass for enhancing dispersion effect of the copolymer to the pigment.

—Self-Dispersion Pigment—

The self-dispersion pigment (in the case of cationized pigment) is a coupling of the hydrophilic group (which is coupled directly or via other atomic group) with at least one selected from the following quaternary ammonium groups. The present invention is, however, not limited thereto.

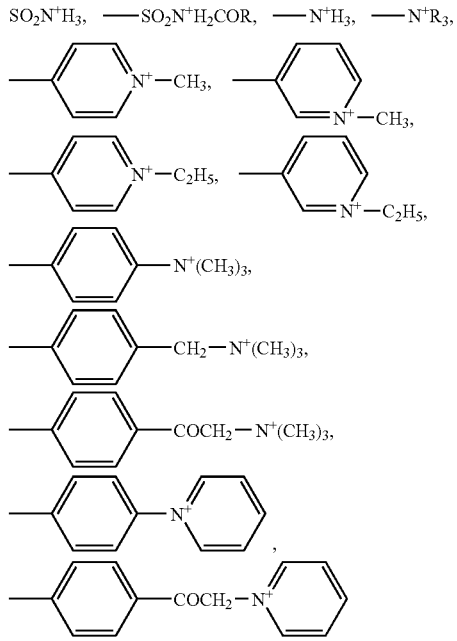

In the above formulas, R denotes any one of i) an alkyl group (direct chain or branch chain) having 1 to 12 carbon atoms, ii) a phenyl group which is substitutional or nonsubstitutional, and iii) a naphthyl group which is substitutional or nonsubstitutional. Hereinabove, the cationic group has, for example, $NO^{3-}$ and $CH_3COO-$ as counter ion.

Examples of the method of manufacturing the self-dispersion pigment which is charged cationic by the coupling of the hydrophilic group include the coupling of N-ethyl pyridyl group: Treating the pigment with 3-amino-N-ethyl pyridinium bromide.

The pigment which is charged cationic by introducing the hydrophilic group to the pigment surface has an excellent water dispersibility due to ion repulsion. With this, containing the pigment in the treating liquid (which contains the cationic coloring material) can keep stable dispersion state, without adding dispersant and the like. Especially, the above pigment is preferred to be a carbon black.

—Surface Tension of Cationic Coloring Material-Containing Treating Liquid—

Moreover, the cationic coloring material-containing treating liquid of the present invention can better the permeability of the cationic coloring material-containing treating liquid of the recorded image in the case of recording to the plain paper and the like. Simultaneously with this, this cationic coloring material-containing treating liquid can better the matching with the ink jet head. With the above, the cationic coloring material-containing treating liquid itself is preferred to have surface tension γ at 25° C. in a range of 10 N/m (dyn/cm) to 60 mN/m (dyn/cm), preferably 10 mN/m≦γ≦35 mN/m, more preferably 10 mN/m≦γ≦30 mN/m, still more preferably 10 mN/m≦γ≦25 mN/m. Moreover, the viscosity thereof is preferred to be adjusted to 1 mPa·s (cP) to 30 mPa·s (cP), preferably 2 mPa·s (cP) to 20 mPa·s (cP), still more preferably 3 mPa·s (cP) to 15 mPa·s (cP).

The mass density of the coloring material component of the above cationic coloring material-containing treating liquid may be properly selected according to the coloring material type (such as aqueous dye, pigment, self-dispersion pigment, and the like), preferably 0.1% by mass to 20% by mass relative to the above liquid component, especially preferably 0.1% by mass to 12% by mass.

With the mass density of the coloring material component being 0.3% to 7%, the following description can be made in terms of density:
i) a first density: density of the component reactive with the recording liquid, where the component is a cationic fine particle in the cationic coloring material-containing treating liquid, and
ii) a second density: density of the cationic coloring material.

With a ratio of the first density to the second density being 1 to 1.2 or less (mass basis), the coloring property of the image which is formed in an ordinary 2-liquid system may become excellent, or especially excellent with the above ratio being 1 to 1.0 or less (mass basis).

The recording liquid and the cationic coloring material-containing treating liquid which constitute the ink set of the present invention can, by so constituting that the above two liquids may react when contacting, effectively relieve the bleeding on the boundary between different color ranges. Herein, the term "reaction" includes a connotation that a coloring material dissolved or dispersed in at least one of the two liquid components becomes unstable by the contact of the two liquids. Methods of reacting the two liquid components include 1) adding polyvalent metal compound to the recording liquid or the cationic coloring material-containing treating liquid; 2) causing pH change to a mixed color part by contact of the recording liquid and the cationic coloring material-containing treating liquid 3) inversing the polarity between the recording liquid and the cationic coloring material-containing treating liquid.

—Polyvalent Metal Compound—

The above polyvalent metal compound of the present invention is made from a polyvalent metal ion (divalent or more) and an anion as a counter ion of the polyvalent metal ion. Specific examples of the polyvalent metal ion include divalent metal ions such as $Ca^{2+}$, $Cu^{2+}$, $Ni^{2+}$, $Mg^{2+}$, $ZN^{2+}$, $Ba^{2+}$ and the like; and trivalent metal ions such as $Al^{3+}$, $Fe^{3+}$, $Cr^{3+}$ and the like. As the anion, $Cl^-$, $NO^{3-}$, $I^-$, $Br^-$, $SO_4^-$, $CH_3COO^-$ and the like are raised. Especially, the metal salt made of $Ca^{2+}$ or $Mg^{2+}$ is preferable for its good effect of suppressing bleeding.

Specific examples of the compounds include magnesium acetate, calcium acetate, magnesium nitrate, calcium nitrate, magnesium phosphate, calcium phosphate, magnesium carbonate, calcium carbonate, magnesium oxalate, calcium oxalate, and the like, but not limited thereto. Density of the colored cationic coloring material-containing treating liquid of the above polyvalent metal compounds may be properly determined as long as printing quality and clogging preventing effect can be obtained, preferably 0.1% by mass to 20% by mass, more preferably 0.5% by mass to 10% by mass. Herein, the coloring material in the cationic coloring material-containing treating liquid which is added by the polyvalent metal compound is preferred to be a dye that is excellent in solubility, specifically for example, the dye having 2 or more sulfone groups.

—pH Preparing Agent—

Examples of the pH preparing agent used for suppressing the bleeding on the boundary of the colored cationic coloring material-containing treating liquid include: compounds having hydrochloric acid, acetic acid and carboxyl group; compounds having carbonic acid, sulfuric acid and sulfone group; acid materials such as nitric acid, phosphorous acid compound, sulfurous acid, nitrous acid and the like; and alkali materials such as alkali metal hydroxide, alkali earth metal hydroxide, alcohol amines, ammonium salts and the like.

Hereinafter described is the method of forming the colored part on the record medium of the present invention. The following steps are included: step (i) adding anionic or cationic colored cationic coloring material-containing treating liquid (in which coloring material is contained) to the record medium, and step (ii) adding a liquid component (in which fine particle's surface having polarity different from that of the cationic coloring material-containing treating liquid is contained in a dispersion state) to the record medium, On the surface of the above record medium, the colored cationic coloring material-containing treating liquid and the liquid component contact each other in their liquid state. Hereinafter described is the method of adding, to the record medium, the liquid component and the colored cationic coloring material-containing treating liquid which have the above structure.

As described above, the method of forming the colored part on the record medium of the present invention includes the step (ii) of adding the liquid component to the record medium, and the step (i) of adding the anionic or cationic colored cationic coloring material-containing treating liquid (in which the coloring material is contained) to the record medium. In this case, the liquid component is to be added to at least one of the following:

A) a colored part forming range of the record medium which range is formed by the colored cationic coloring material-containing treating liquid (in which the coloring material is contained), and B) the vicinity of A), in such a manner that the colored cationic coloring material-containing treating liquid and the liquid component can contact with each other in their liquid state. The colored part forming range hereinabove is a range to which the dot of the cationic coloring material-containing treating liquid adheres. The vicinity of the colored part forming range is a range 1 dot to 5 dots away from the above dot-adhesion range.

As long as the above liquid component and the colored cationic coloring material-containing treating liquid can contact with each other on the record medium in their liquid state, the method of forming the colored part on the record medium of the present invention is not specifically limited. Thus, the liquid component or the cationic coloring material-containing treating liquid can be added first to the record medium (namely, the order is not a problem). For example, the step (i) can be carried out after the step (ii), or the step (ii) can be carried out after the step (i). Moreover, the step (i) can followed by the step (ii), and still followed by the step (i).

Moreover, in the case that the liquid component is at first added to the record medium, the time from the addition of the liquid component to the record medium to the addition of the cationic coloring material-containing treating liquid to the record medium is not especially limited. In this case, however, the cationic coloring material-containing treating liquid is preferred to be added to the record medium substantially simultaneously or within several seconds afterward, so as to allow the contact of the liquids.

—Record Medium—

The record medium used for the method of forming the colored part on the above record medium of the present invention is not specifically limited, and therefore can be selected from those in the prior art, specifically, so-called plain paper is preferably used such as copy paper, bond paper and the like. As a matter of course, coat paper specifically prepared for the ink jet record, and an OHP transparent film are also preferably used. Moreover, general woodfree paper and luster paper are preferably used.

(Cartridge)

The treating liquid cartridge of the present invention has a receptacle receiving therein the above treating liquid of the present invention, and other member and the like which are properly selected when necessary.

The recording liquid cartridge of the present invention has a receptacle receiving therein the above recording liquid of the present invention, and other member and the like which are properly selected when necessary.

The above receptacle is not specifically limited, and can be properly selected according to the object in terms of its shape, structure, scale, material and the like, for example, an ink bag formed of aluminum laminate film, resin film and the like.

(Image Recording Method and Image Forming Apparatus)

The image recording method of the present invention includes an ink jetting step, and other step properly selected when necessary, examples thereof including stimulation causing step, controlling step and the like.

The image recording apparatus of the present invention includes an ink jetting unit, and other unit properly selected when necessary, examples thereof including stimulation causing step, controlling step and the like.

The image recording method of the present invention can be preferably carried out with the image forming apparatus of the present invention, and the above ink jetting step can be preferably carried out with the above ink jetting unit. Moreover, the above other step can be preferably carried out with the above other unit.

—Ink Jetting Step and Ink Jetting Unit—

The above ink jetting step applies stimulation to the above ink set of the present invention, jetting the ink set, thus recording the image.

The ink jetting unit is not specifically limited, for example, various nozzles for ink discharge can be raised.

Of the present invention, at least a part of a liquid chamber section, a fluid resistance section, a vibration plate, and a nozzle member of the ink jet head is preferred to be made of material containing at least one of silicon and nickel.

Moreover, the nozzle of the ink jet is preferred to have diameter of 30 μm or less, more preferably 1 μm to 20 μm.

The above stimulation can be caused by a stimulation generating unit, and is not specifically limited, therefore can be properly selected according to the object, examples thereof including heat (temperature), pressure, vibration, light and the like. These stimulations can be used alone, or in combination of two or more. Among the above, heat and pressure are preferable.

Examples of the above stimulation generating unit include heating apparatus, pressing apparatus, piezoelectric element, vibration generating apparatus, ultrasonic oscillator, light, and the like.

More specifically, a piezoelectric actuator such as piezoelectric element, a thermal actuator using phase change (caused by boiling of liquid's film) by means of electricity-heat transducer such as exothermic resistor, a shape-memorized alloy actuator using metal phase change caused by temperature change; an electrostatic actuator and the like using electrostatic force; and the like.

Mode of the above ink set jetting is not specifically-limited, and may vary with the above stimulation type and the like. For example, when the above stimulation is "heat," a heat energy corresponding to the recording signal is to be applied to the above ink set in the record head, by means of, for example, a thermal head and the like, then the heat energy causes bubble to the above ink set, then, the bubble's pressure may discharge and inject the ink set (in a form of liquid droplet) from the nozzle hole of the record head. On the other hand, when the above stimulation is "pressure," a voltage is to be applied to the piezoelectric element which is adhered to a position referred to as pressure chamber located in the ink passage in the record head, then bending the piezoelectric element, then decreasing the capacity of the pressure chamber, thus discharging and injecting the ink set (in a form of liquid droplet) from the nozzle hole of the above record head.

As long as being capable of controlling operation of the above various units, the above controlling unit is not specifically limited, and can be properly selected according to the object, examples thereof including sequencer, computer and the like.

Hereinafter described referring to the drawing is the image recording method of the present invention and the image forming apparatus carrying out the image recording method.

Figure 1:
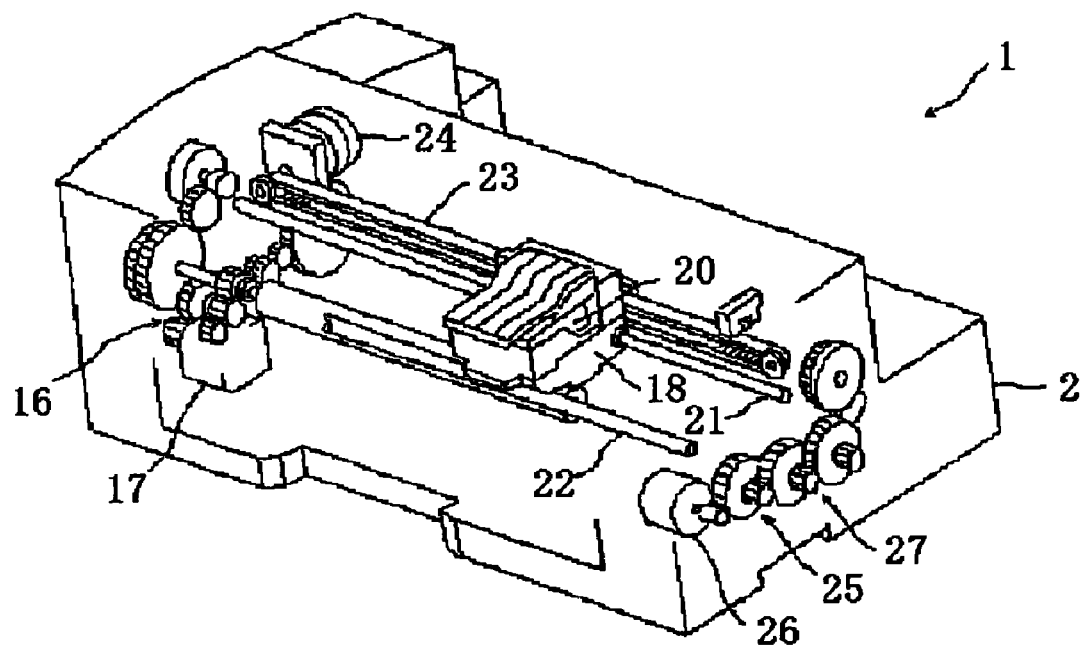
FIG. 1 is a schematic of an example of an image recording apparatus of the present invention.

The image forming apparatus in FIG. 1 has a structure where the treating liquid and the recording liquid are received in a cartridge (20), and the treating liquid and the recording liquid are supplied from the cartridge (20) to a record head. Herein, the cartridge (20) is so mounted as to be separated into the treating liquid and the recording liquid (per color).

The record head is mounted to the carriage (18), and is moved by a timing belt driven with a main scanning motor (24) in such a manner as to be guided by a guide shaft (21) and a guide shaft (22). On the other hand, a record medium is located in a position facing the record head by a platen.

Figure 2:
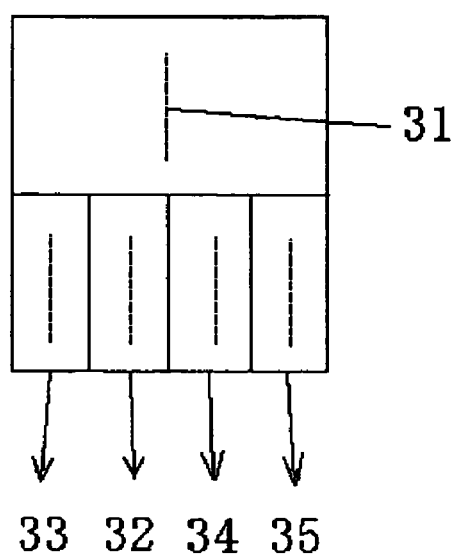
FIG. 2 is a schematic of an example of a record head of the present invention.

FIG. 2 shows an enlarged view of the nozzle face of the record head. A nozzle (31) discharging the treating liquid is put longitudinally. A nozzle (32), a nozzle (33), a nozzle (34) and a nozzle (35), respectively, discharge a yellow ink recording liquid, a magenta ink recording liquid, a cyanogen ink recording liquid and a black recording liquid.

Figure 3:
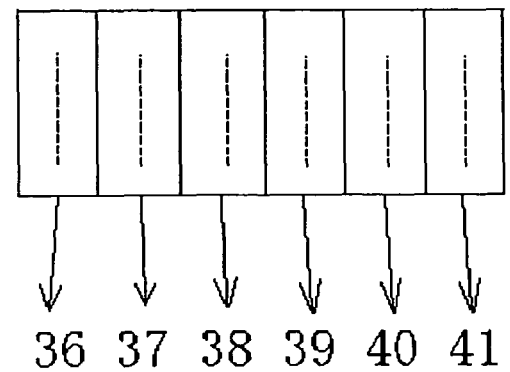
FIG. 3 is a schematic of another example of the record head of the present invention.

Moreover, as is seen in FIG. 3, in the record head, all the nozzles can be arranged horizontally. FIG. 3 shows a discharge nozzle (36) and a discharge nozzle (41) which are for the treating liquid; and a nozzle (37), a nozzle (38), a nozzle (39) a and nozzle (40) respectively discharging a yellow ink recording liquid, a magenta ink recording liquid, a cyanogen ink recording liquid and a black ink recording liquid. With the above record head having the treating liquids' discharge nozzles respectively on the right and left sides, the printing is accomplished when the record head moving on the carriage is in its forward direction or backward direction. More specifically, on either the going-way or on the backing-way, the treating liquid can be adhered at first, and the then the color ink is added thereon, or the inverse operation is accomplished. In sum, the mobile direction of the record head does not cause the image density variation.

The image forming apparatus of the present invention is capable of replenishing treating liquid, and the recording liquid by replacing the cartridge. This cartridge may be united with the record head.

Figure 4:
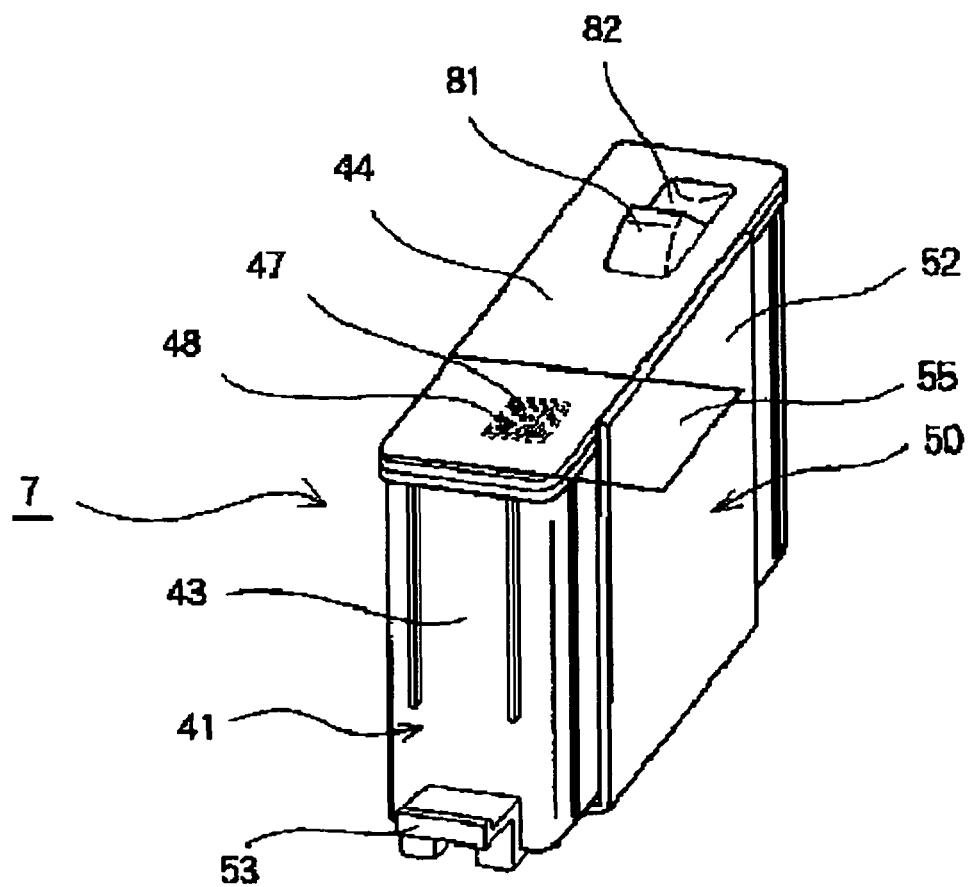
FIG. 4 is a perspective external view of an example of a cartridge before being loaded to the image recording apparatus of the present invention.
Figure 5:
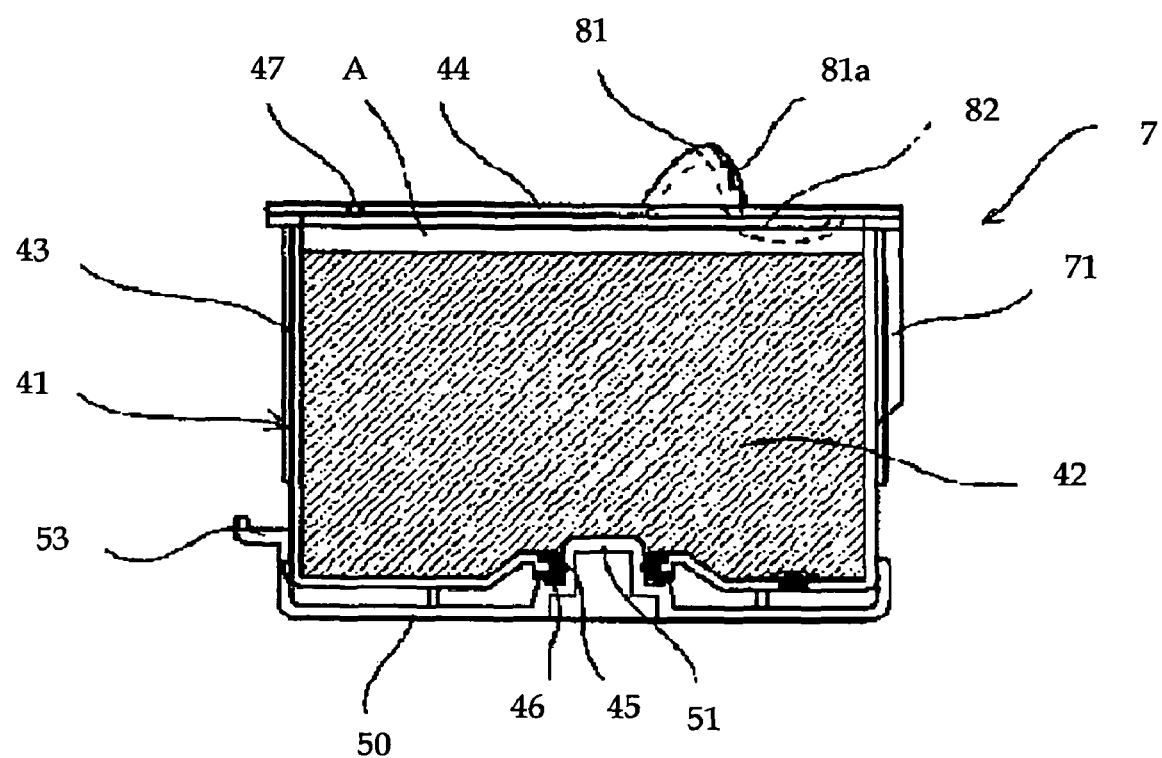
FIG. 5 is a schematic cross sectional view of an example of the cartridge of the present invention.

FIG. 4 and FIG. 5 show a cartridge capable of receiving the treating liquid and the recording liquid of the present invention. The cartridge in FIG. 4 and FIG. 5 can receive the treating liquid and the recording liquid.

Preferably, the recording liquid and the treating liquid which are discharged by the respective print heads can be superimposed in a range of the same section. The present invention is, however, not limited to the above range. For example, i) applying the thinned treating liquid, then superimposing the recording liquid on the treating liquid which is enlarged with feathering-bleeding and the like, and ii) applying the treating liquid only to the image's edge, and then superimposing a part of the recording liquid are allowed.

Moreover, the recording liquid of the present invention may be properly blended, when necessary, with additives such as viscosity controlling agent, pH preparing agent, antiseptic, fungicide, various surfactants, oxidation inhibitor, rust preventive, evaporation promoter, water-soluble anionic compound, binder resin and the like. Selection of the surfactant is especially important for adjusting the permeability of the liquid component into the record medium. For further imparting the anionic property to the recording liquid or for other purposes, the water-soluble anionic compound can be arbitrarily selected as long as the operation and effect of the present invention are not damaged.

For further improving the friction (or abrasion) resistance of the anionic fine particle or for other purposes, the binder resin may be used in combination, as long as the record medium's texture and the recording liquid's storage stability and discharge stability are not damaged. For example, the selection can be arbitrarily made from water-soluble polymer, emulsion, latex and the like.

(Ink Set)

Imparting the ink set which uses the treating liquid and the recording liquid to a recorded body, and contacting the treating liquid with the recording liquid on the recorded body for reaction can bring about an image recorded matter with high quality.

The reaction of the component and the coloring material, and the effect thereof can be inferred as follows. The present invention is, however, not limited by the inference.

The fine particle contained in the treating liquid of the present invention has a charged surface. The components thereof causing repulsion attributable to the charged surface can stabilize the dispersion. Moreover, the fine particle has an isoelectric point. When the recording liquid containing the coloring material having different polarity from that of the fine particle contact the treating liquid containing the above component, an electric operation may strongly absorb the coloring material to the fine particle. In this case, the charged surface of the fine particle may be neutralized by the electric charge of the coloring material, thus eliminating the component-to-component repulsion, resulting in formation of a large aggregate made by the fine particle and a large aggregate made by the coloring material. Moreover, since the water-soluble group such as the carbonyl group and the sulfonyl group owned by the coloring material may be covered with the component in the absorbing, solubility of the aggregate in the water may be rapidly decreased, thus further enlarging the aggregate. Moreover, so adjusting the pH of the mixture as to become close to the pH causing the isoelectric point of the treating liquid's component allows the fine particle alone to aggregate, thereby rapidly forming such aggregate.

Whether or not the aggregate component is the fine particle, in the ink set with the components of the recording liquid and the treating liquid so adjusted for the extremely rapid aggregation, the anionic compound in the recording liquid contacting the cationic compound in the treating liquid may rapidly cause the aggregation to the interface, thus forming a thin aggregate layer.

In this case, the aggregate layer acts as a filter that prevents, to a certain extent, permeation of a large-particle-diameter anionic compound such as the anionic coloring material in the recording liquid. Thereby, most of the large-particle-diameter anionic compounds may stay on the surface layer of the record medium, failing to carry out an in-depth permeation into the record medium. Moreover, the aggregate layer is, as the case may be, a semitransparent film that transmits water, ion and low molecular polyvalent metal compound. In this case, the treating liquid's reactive component may react with the ion and the salt permeated from the recording liquid side, or may aggregate due to pH change, thus further preventing the in-depth permeation of the coloring material into the record medium. Moreover, the recording liquid may aggregate in the vicinity of the surface of the record medium for the following operations: i) anionic coloring material causing a salting-out reaction with the ion transmitted from the treating liquid's side, ii) and the coloring material-to-coloring material aggregation caused by decreased dispersion stability due to pH change. As a result, the coloring material may stay in the vicinity of the surface, thereby imparting the high image density and low back-through density to the printed matter. Moreover, the coloring material having increased density in the vicinity of the record medium's surface can better the embedding to the record medium, preparing the high-chroma printed matter. Especially, the above effect is remarkable in the plain paper where the difference between the record medium's chroma and the coloring material's chroma is great.

Most of the coloring materials and most of the cationic fine particles may individually react with the ion and the salt, and individually aggregate due to pH change, thus forming the multilayer structure. The coloring material may also aggregate and fix, thus bringing about the printed matter excellent in water resistance, light resistance, and fixing property.

Moreover, the following excellent effects can be obtained. Using the cationic treating liquid of the present invention can bring about a coloring property as excellent as that of ink jet coat paper. In image areas with a lot of ink adhesion such as shadow part and solid print part, the amount of white mist and color unevenness may be small, thus making an excellent color evenness. With an extremely efficient coloring property compared with the coat paper, the application of the cationic fine particle can be decreased in amount, thereby bringing about an excellent friction (or abrasion) resistance of the printed part, especially for plain paper printing, without damaging feeling of the plain paper.

Moreover, when the recording liquid and the treating liquid permeate, the aggregate may be trapped by a porous part of the record medium. With this, the coloring material becomes unlikely to move, thus effectively preventing the feathering and the color bleeding. Moreover, the high gloss of the fine particle itself may increase gloss of the printed matter by reacting with the recording liquid. Moreover, the component and the coloring material forming a particulate aggregate to be superimposed in a form of a stone wall in the vicinity of the surface of the record medium can form a permeative film. With this, the vehicle may rapidly permeate into the record medium, thus bettering the color bleeding and dryness. Moreover, suppressing the ink's penetration to the backside of the record medium can accomplish a good both-side printing. Summarizing the above operations, the image forming method of the present invention can bring about the recorded matter with higher image quality than that according to the prior art.

The ink set having the treating liquid having the surface tension $\gamma$ expressed by $10 \leqq \gamma \leqq 35$ can prepare a printed matter with especially high image quality.

More preferable range is $10 \leqq \gamma \leqq 30$, still more preferable range is $10 \leqq \gamma \leqq 25$.

For use of the treating liquid having the above low surface tension, the defoaming agent in an amount of 0.001% by mass to 10% by mass is indispensable for preparing a stable printed matter.

Moreover, so adjusting the surface tension $\gamma 1$ of the treating liquid and the surface tension $\gamma 2$ of the recording liquid as to make γ1/γ2<1 can more effectively decrease the feathering of the printed matter. The treating liquid may be more widely spread than the recording liquid, thus suppressing the outward oozing of the liquid droplet.

The mechanism that the higher image quality can be brought about by the lowering of the surface tension is inferred hereinafter, compared with the high-surface-tension, referring to FIG. 7A and FIG. 7B. The present invention is, however, not limited by the inference.

Figure 7A:
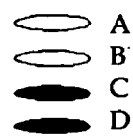
FIG. 7A and FIG. 7B each show a flow chart showing a structure of making an especially high-image-quality printed matter by the image forming method.
Figure 7A:
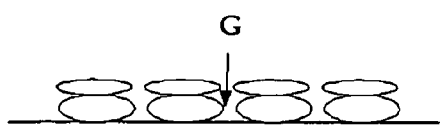
Figure 7A:
Figure 7A:
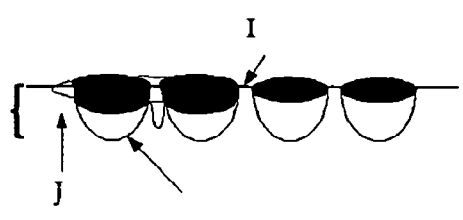
Figure 7A:
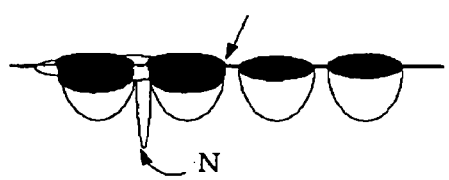
Figure 7B:
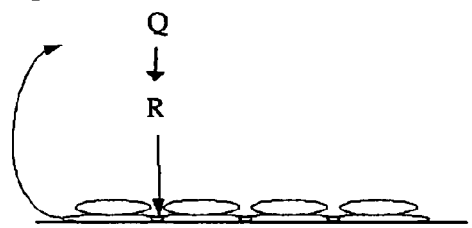
Figure 7B:
Figure 7B:
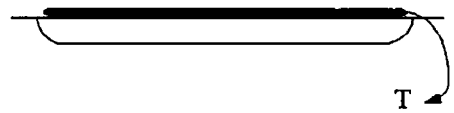
Figure 7B:
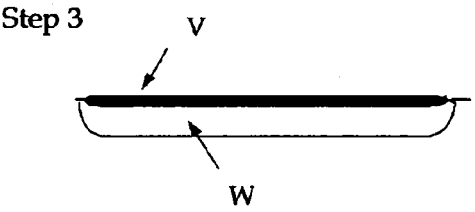
Figure 8:
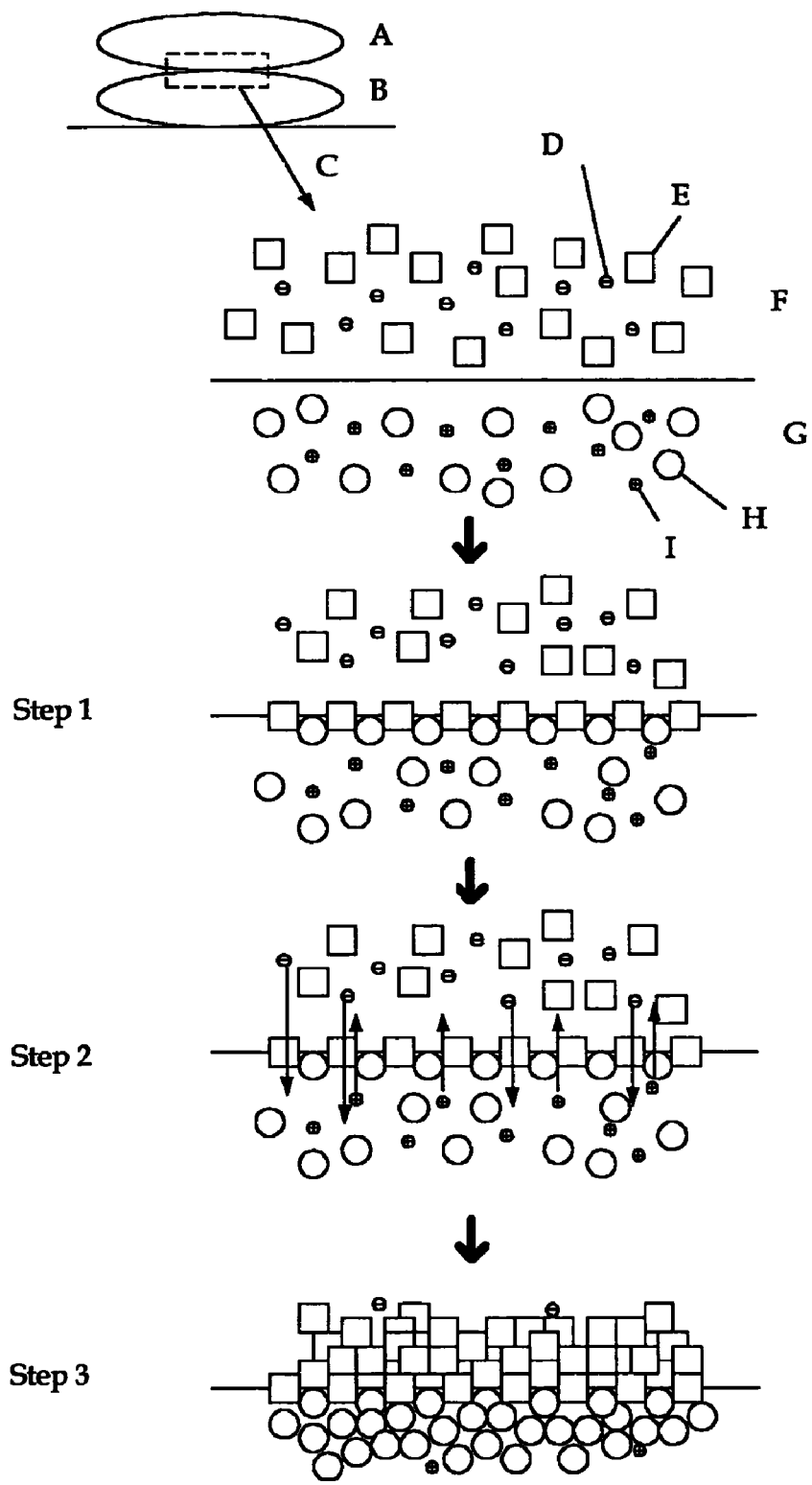
FIG. 8 is a schematic of a process of forming the image by the image recording method using the ink set of the present invention, where the fine particle in the treating liquid is substantially free from being mixed with the coloring material in the recording liquid, instead forming an aggregate, in which step 1 shows aggregate layer formed in the vicinity of interface, step 2 shows mobility of ion, and step 3 shows pH change causing rapid dispersion, smashing and aggregation; with "A," "B," "C," "D," "E," "F," "G," "H," and "I," respectively denoting "Recoding liquid," "Treating liquid," "Enlarged," "Base," "Coloring material," "Recording liquid's side," "Treating liquid's side," "Fine particles," and "Acid."

At the top in FIG. 7A and FIG. 7B, denoted by "A," "B," "C," and "D," are respectively "Treating liquid," "Unreacted ink," "Mixture (before aggregation)," and "Aggregate."

FIG. 7A describes "High-surface-tension treating liquid." Step 1 shows "Ink's impact," with an alphabetical "G" denoting "Treating liquid's embedding is not good." Step 2 shows "Aggregate reaction," with an alphabetical "I" denoting "Treating liquid's embedding is not good," and an alphabetical "J" denoting "Feathering," and an alphabetical "K" denoting "Treating liquid permeates in-depth." Step 3 shows "Fixing," with an alphabetical "M" denoting "Ink's embedding is not good," and an alphabetical "N" denoting "Ink permeates in-depth through a gap of treating liquid's embedding→leading to back-through."

FIG. 7B describes "Low-surface-tension treating liquid." Step 1 shows "Ink's impact," with an alphabetical "Q" denoting "Treating liquid having low surface tension spreads widely," and an alphabetical "R" denoting "Treating liquid's embedding is good." Step 2 shows "Aggregate reaction," with an alphabetical "T" denoting "Ink's embedding is good." Step 3 shows "Fixing," with an alphabetical "V" denoting "Good embedding→decreasing unevenness→increasing optical density (OD)," and an alphabetical "W" denoting "Shallow ink permeation→decreasing back-through density."

Step 1: Soon After Ink's Impact

Use of the high-surface-tension treating liquid may deteriorate embedding of the treating liquid to the record medium. On the other hand, use of the high-viscosity low-surface-tension treating liquid may not make a rapid permeation due to the high viscosity, and the liquid droplet may be smashed due to the low surface tension, thus embedding the surface widely, resulting in a good embedding.

Step 2 to Step 3: From Aggregate Reaction to Fixing

Use of the high-surface-tension treating liquid may deepen the permeation depth of the treating liquid, thus requiring more ion's mobile distance, resulting in longer reaction time. In this period, the unreacted coloring material may be spread, and thereby cause feathering, which may be responsible for color bleeding. Moreover, the coloring material may permeate in-depth into the record medium from a part where the embedding state of the treating liquid is not good, thereby causing the back-through.

Contrary to the above, the high-viscosity low-surface-tension treating liquid having the widely spread treating liquid has its permeation depth smaller, and the required ion's mobile distance is short, thus forming the aggregate in relatively a short time. With this, the feathering and the color bleeding can be decreased. In addition, although the ink (ink)'s surface tension may be lowered, the treating liquid having the good embedding does not permeate in-depth into the record medium but may spread sideward, resulting in good embedding of the coloring material (ink). With this, the image density may be improved, thus decreasing the back-through density.

Moreover, the difference in pH 2 or more between the treating liquid and the recording liquid can bring about printed matter having still higher-image-quality, which is attributable to the following operation: The treating liquid and the recording liquid contacting each other may cause sufficiently high density slope of the proton, thus prompting the diffusion speed of the proton, resulting in more promoted aggregate reaction.

The treating liquid having the discharge amount M1 and the recording liquid having the discharge amount M2 expressed by M1/M2=0.2 to 3.0 is preferable. Less than 0.2 may be responsible for an insufficient discharge amount of the treating liquid, failing to obtain the aggregation effect. When a sufficient amount of recording liquid is discharged with M1/M2 of more than 3.0, the total liquid amount becomes too large, thus swelling and cockling to the record medium and causing the feathering and the color bleeding.

A higher-image-quality printed matter can be obtained by adjusting the pH of the treating liquid and the pH of the recording liquid in the following manner, in the case that the cationic fine particle is contained in the treating liquid:

With a contact of the treating liquid and the recording liquid, the pH of the mixture falls close to the pH causing an isoelectric point of the cationic fine particle in the treating liquid.

Preferable pH of the mixture may be expressed as follows:

$$\beta-2 \leq \alpha \leq \beta+2$$

(where α denotes the mixture's pH, and β denotes the pH causing the isoelectric point of the cationic fine particle)

More preferably $\beta-1.5 \leq \alpha \leq \beta+1.5$, still more preferably $\beta-1.0 \leq \alpha \leq \beta+1.0$. The closer to the isoelectric point, the better the cationic fine particle may aggregate, thus bringing about higher effect.

Moreover, a printed matter with still higher image quality may be obtained by selecting the coloring material such that α (mixture's pH) can aggregate even with a single recording liquid.

Hereinafter described are examples of the present invention, and comparative examples thereto, based on weight part and % by weight.

| <Treating liquid A> | |
|---|---|
| Cationic colloidal silica (ST-AK [Nissan Chemical Industries, Ltd.]) | 15.0 parts |
| Glycerin | 25.0 parts |
| Olefin E1010 | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

| <Treating liquid B> | |
|---|---|
| Cationic colloidal silica (ST-AK [Nissan Chemical Industries, Ltd.]) | 15.0 parts |
| Glycerin | 25.0 parts |
| Olefin STG [Shin-Etsu Chemical Co., Ltd.] | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

<Treating liquid C>

| | |
|---|---|
| Cationic colloidal silica (ST-AK [Nissan Chemical Industries, Ltd.]) | 15.0 parts |
| Glycerin | 25.0 parts |
| Cationic surfactant (cation G50 [Sanyo Chemical Industries, Ltd.]) | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

<Treating liquid D>

| | |
|---|---|
| Cationic colloidal silica (ST-AK [Nissan Chemical Industries, Ltd.]) | 15.0 parts |
| Glycerin | 25.0 parts |
| Dispanol TOC [NOF Corporation] | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

<Treating liquid E>

| | |
|---|---|
| Cationic colloidal silica (ST-AK [Nissan Chemical Industries, Ltd.]) | 15.0 parts |
| Glycerin | 25.0 parts |
| 2-ethyl hexane diol | 1.0 part |
| KM-72F (silicone defoaming agent) [Shin-Etsu Chemical Co., Ltd.] | 0.1 part |
| Ion-exchange water | 58.9 parts |

<Treating liquid F>

| | |
|---|---|
| Cationic colloidal silica (ST-AK [Nissan Chemical Industries, Ltd.]) | 15.0 parts |
| Glycerin | 25.0 parts |
| KM-72F (silicone defoaming agent) [Shin-Etsu Chemical Co., Ltd.] | 0.1 part |
| Ion-exchange water | 59.9 parts |

<Treating liquid G>

| | |
|---|---|
| Cationic colloidal silica (ST-AK [Nissan Chemical Industries, Ltd.]) | 15.0 parts |
| Glycerin | 25.0 parts |
| Olefin STG | 2.0 parts |
| 2-ethyl hexane diol | 1.0 part |
| KM-72F (silicone defoaming agent) [Shin-Etsu Chemical Co., Ltd.] | 0.001 part |
| Ion-exchange water | 56.999 parts |

<Treating liquid H>

| | |
|---|---|
| Cationic colloidal silica (ST-AK [Nissan Chemical Industries, Ltd.]) | 15.0 parts |
| Glycerin | 25.0 parts |

-continued

<Treating liquid H>

| | |
|---|---|
| Olefin STG | 2.0 parts |
| 2-ethyl hexane diol | 1.0 part |
| KM-72F (silicone defoaming agent) [Shin-Etsu Chemical Co., Ltd.] | 10.0 parts |
| Ion-exchange water | 47.0 parts |

<Treating liquid I>

| | |
|---|---|
| Cationic colloidal silica (ST-AK [Nissan Chemical Industries, Ltd.]) | 15.0 parts |
| Glycerin | 25.0 parts |
| Olefin STG | 2.0 parts |
| 2-ethyl hexane diol | 1.0 part |
| Ion-exchange water | 57.0 parts |

<Treating liquid J>

| | |
|---|---|
| Cationic colloidal silica (ST-AK [Nissan Chemical Industries, Ltd.]) | 15.0 parts |
| Glycerin | 25.0 parts |
| Olefin STG | 2.0 parts |
| 2-ethyl hexane diol | 1.0 part |
| KM-72F (silicone defoaming agent) [Shin-Etsu Chemical Co., Ltd.] | 13.0 parts |
| Ion-exchange water | 47.0 parts |

<Treating liquid K>

| | |
|---|---|
| Poly acrylamide | 15.0 parts |
| Glycerin | 25.0 parts |
| Olefin STG | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

<Treating liquid L>

| | |
|---|---|
| Ethylene diamine | 15.0 parts |
| Glycerin | 25.0 parts |
| Olefin STG | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

<Treating liquid M>

| | |
|---|---|
| Magnesium glycerophosphate | 15.0 parts |
| Glycerin | 25.0 parts |
| Olefin STG | 2.0 parts |
| 2-ethyl hexane diol | 1.0 part |
| KM-72F (silicone defoaming agent) [Shin-Etsu Chemical Co., Ltd.] | 0.1 part |
| Ion-exchange water | 56.9 parts |

| <Treating liquid N> | |
| --- | --- |
| Cationic colloidal silica (ST-AK [Nissan Chemical Industries, Ltd.]) | 15.0 parts |
| Glycerin | 25.0 parts |
| 2-pyrrolidone | 1.0 part |
| Olefin STG | 2.0 parts |
| KM-72F (silicone defoaming agent) [Shin-Etsu Chemical Co., Ltd.] | 0.1 part |
| Lithium hydroxide | 0.35 part |
| Ion-exchange water | 56.55 parts |

| <Treating liquid O> | |
| --- | --- |
| Cationic colloidal silica (ST-AK [Nissan Chemical Industries, Ltd.]) | 15.0 parts |
| Glycerin | 25.0 parts |
| 2-pyrrolidone | 1.0 part |
| Olefin STG | 2.0 parts |
| KM-72F (silicone defoaming agent) [Shin-Etsu Chemical Co., Ltd.] | 0.1 part |
| Lithium hydroxide | 0.37 part |
| Ion-exchange water | 56.53 parts |

| <Treating liquid P> | |
| --- | --- |
| Cationic colloidal silica (ST-AK [Nissan Chemical Industries, Ltd.]) | 15.0 parts |
| Glycerin | 25.0 parts |
| 2-pyrrolidone | 1.0 part |
| Olefin STG | 2.0 parts |
| KM-72F (silicone defoaming agent) [Shin-Etsu Chemical Co., Ltd.] | 0.1 part |
| 1N HCl | 3.65 parts |
| Ion-exchange water | 53.25 parts |

| <Recording liquid I> | |
| --- | --- |
| C.I. pigment red | 8.0 parts |
| 1,3-butane diol | 22.5 parts |
| Glycerin | 7.5 parts |
| Surfactant | 1.0 part |
| 2-pyrrolidone | 2.0 parts |
| Dihydro sodium acetate | 0.2 part |
| Sodium thiosulfate | 0.2 part |
| Water | 58.6 parts |

| <Recording liquid II> | |
| --- | --- |
| C.I. pigment red | 8.0 parts |
| Anionic colloidal silica (ST-20 [Nissan Chemical Industries, Ltd.]) | 5.0 parts |
| 1,3-butane diol | 22.5 parts |
| Glycerin | 7.5 parts |
| Surfactant | 1.0 part |
| 2-pyrrolidone | 2.0 parts |
| Dihydro sodium acetate | 0.2 part |
| Sodium thiosulfate | 0.2 part |
| Ion-exchange water | 53.6 parts |

| <Recording liquid III> | |
| --- | --- |
| C.I. direct red 225 | 4.0 parts |
| Ethylene glycol | 15.0 parts |
| Glycerin | 5.0 parts |
| Surfactant | 1.0 part |
| 2-pyrrolidone | 2.0 parts |
| Dihydro sodium acetate | 0.2 part |
| Sodium thiosulfate | 0.2 part |
| Ion-exchange water | 72.6 parts |

| <Recording liquid IV> | |
| --- | --- |
| C.I. pigment red | 8.0 parts |
| Ethylene glycol | 15.0 parts |
| Glycerin | 5.0 parts |
| Surfactant | 1.0 part |
| 2-pyrrolidone | 2.0 parts |
| Dihydro sodium acetate | 0.2 part |
| Sodium thiosulfate | 0.2 part |
| Acetic acid | 0.2 part |
| Ion-exchange water | 68.4 parts |

| <Recording liquid V> | |
| --- | --- |
| C.I. pigment red | 8.0 parts |
| Ethylene glycol | 15.0 parts |
| Glycerin | 5.0 parts |
| Surfactant | 1.0 part |
| 2-pyrrolidone | 2.0 parts |
| Dihydro sodium acetate | 0.2 part |
| Sodium thiosulfate | 0.2 part |
| 0.1 N sodium hydroxide | 2.0 parts |
| Ion-exchange water | 66.6 parts |

With the thus obtained treating liquid A to treating liquid P and the thus obtained recording liquid I to recording liquid V, the surface tension was measured by the Wilhelmy (plate) method, using CBVP-Z made by Kyowa Interface Science Co., LTD. Moreover, the $\zeta$ potential was measured with a dense $\zeta$ potential meter (ultrasonic wave method) ESA8000 made by Matec Applied Sciences. The results are shown in Table A and Table B.

TABLE A

| | Surface tension (mN/m) | $\zeta$ potential (mV) |
| --- | --- | --- |
| Treating liquid A | 14.5 | 65 |
| Treating liquid B | 23.0 | 61 |
| Treating liquid C | 26.5 | 61 |
| Treating liquid D | 32.0 | 61 |
| Treating liquid E | 39.9 | 61 |
| Treating liquid F | 41.0 | 61 |
| Treating liquid G | 23.0 | 61 |
| Treating liquid H | 23.0 | 61 |
| Treating liquid I | 23.0 | 61 |
| Treating liquid J | 23.0 | 61 |
| Treating liquid K | 32.0 | not available |
| Treating liquid L | 32.5 | not available |
| Treating liquid M | 32.5 | not available |
| Treating liquid N | 23.0 | 31 |
| Treating liquid O | 23.0 | 2 |
| Treating liquid P | 23.0 | 68 |

No $\zeta$ potential is available from the treating liquid K, the treating liquid L and the treating liquid M, since they are not fine particles and have a cationic component of, respectively, high molecular electrolytic polymer, high molecular electrolytic monomer, and polyvalent metal salt.

TABLE B

|                     | Surface tension (mN/m) | ζ potential (mV) |
|---------------------|------------------------|------------------|
| Recording liquid I   | 33.0                   | −35              |
| Recording liquid II  | 33.0                   | −35              |
| Recording liquid III | 33.0                   | −35              |
| Recording liquid IV  | 33.0                   | −2               |
| Recording liquid V   | 33.0                   | −43              |

Ink Set <Evaluation>

Using an ink set which is a combination of the treating liquid A to the treating liquid P with the recording liquid I to the recording liquid V, the printing on the record medium was carrying out. At first, the treating liquid was hit on the record medium, then the recording liquid was adhered to the record medium. In this case, the droplet of the treating liquid and the droplet of the recording liquid were so adjusted as to be accurately superimposed. For the printing, Ricoh Ipsio Jet300 (modified version) was used.

Evaluation Method and Evaluation Criteria of Recorded Image (1) Discharge Stability Using the printer, the treating liquid patch pattern or the solid patch pattern of an M ink was printed to My paper 6200 made by Ricoh, to thereby prepare print samples. The above operation was repeated 50 times. The discharge stability was evaluated in such a manner as to calculate frequency (probability) of printings of the complete patch pattern.

The evaluation criteria are as follows:

Poor: Discharge failure is caused occasionally. Complete-patch-pattern printed matter can be prepared with a probability of less than 1/50.

Fair: Discharge failure is sometimes caused. Complete-patch-pattern printed matter can be prepared with a probability of 1/50 to less than 49/50.

Good: Discharge failure is scarcely caused. Complete-patch-pattern printed matter can be prepared with a probability of 49/50 or more.

Excellent: Discharge failure is not caused. Complete-patch-pattern printed matter can be continuously prepared.

(2) Storage Stability

The treating liquid or the M ink was kept in a sealed state, and left at rest under environmental temperature of 50° C. for three weeks. Before and after the above rest state, the viscosity change was evaluated, to thereby evaluate the storage stability.

The evaluation criteria are as follows:

Poor: The treating liquid or the M ink has extremely great density increase.

Good: A slight viscosity increase is shown but keeping sufficient storage stability.

Excellent: Viscosity increase is not shown, with storage stability secured.

(3) Image Density

A printer was used for printing solid patch patterns of the M ink to My paper 6200 made by Ricoh, to thereby prepare print samples. With the above patch, the image density was measured with a image-density measuring apparatus (branded as X-Rite).

(4) Back-Through Density

A printer was used for printing solid patch pattern of the M ink to My paper 6200 made by Ricoh, to thereby prepare print samples. With the above patch, the image density of the backface of the patch pattern was measured with X-Rite.

(5) Color Bleeding

A printer was used for printing patterns (including a character "A" of the M ink in the solid print of Bk ink) to My paper 6200 made by Ricoh, to thereby prepare print samples. With the above pattern, boundary color bleeding was checked for by visual inspection. The above Bk ink is a recording liquid made by adding 10.0 parts of Cabojet 300, replacing C.I. pigment red (8.0 parts), to the recording liquid A. Moreover, in terms of discharge amount, the Bk ink was substantially equal to the M ink.

The evaluation criteria are as follows:

Poor: Character has so many boundary color bleedings that the boundary line is unclear.

Fair: Boundary color bleedings are remarkable in many places.

Good: Boundary color bleedings are partly found, but are not remarkable.

Excellent: Boundary color bleedings are not visually found.

(6) Feathering

A printer was used for printing patterns (including a character of the M ink) to My paper 6200 made by Ricoh, to thereby prepare print samples. With the above character, feathering was checked for by visual inspection.

The evaluation criteria are as follows:

Poor: Character has so many featherings that character profile line is unclear.

Fair: Featherings of character profile line are remarkable in many places.

Good: Featherings of character profile line are partly found, but are not remarkable.

Excellent: Featherings of character profile line are not visually found.

(7) Chroma

A printer was used for printing solid patch patterns of the M ink to My paper 6200 made by Ricoh, to thereby prepare print samples. With the above patch, the image density was measured with X-Rite.

(8) Contact Liquid Durability

In the treating liquid or the M ink, Ni metal plate of 10 mm×10 mm×0.5 mm was dipped at 50° C. for ten days, to thereby check the corrosion degree of the Ni metal plate.

The evaluation criteria are as follows:

Poor: Ni metal plate is corroded to disappear.

Fair: Ni metal plate is formed with a hole made by corrosion, failing to keep sufficient durability.

Good: A slight corrosion is found, but keeping sufficient durability.

Excellent: Corrosion is not found, keeping sufficient durability.

Example 1

A printed matter was prepared by using an ink set which is a combination of the treating liquid B and the recording liquid III, to thereby evaluate the image quality. The treating liquid showed the discharge amount M1 of 4.67 [g/cm$^2$], and the recording liquid showed the discharge amount M2 of 4.0162 [g/cm$^2$].

Comparative Example 1

A printed matter was prepared by using an ink set which is a combination of the treating liquid M and the recording liquid III, to thereby evaluate the image quality. The treating liquid showed the discharge amount M1 of 4.58 [g/cm$^2$], and the recording liquid showed the discharge amount M2 of 4.0162 [g/cm$^2$].

TABLE 1

| | Treating liquid | Recording liquid | Multi-layer structure | Image density | Back-through density | Feather | Color bleed | Chroma |
|---|---|---|---|---|---|---|---|---|
| Ex. 1 | B | III | Formed | 1.097 | 0.143 | Excellent | Excellent | 70.6 |
| Compa. ex. 1 | M | | Not formed | 1.008 | 0.243 | Poor | Poor | 62.9 |

The ink set which is the combination of the treating liquid B and the recording liquid III of the example 1 forms the multilayer structure, while the ink set which is the combination of the treating liquid N and the recording liquid III of the comparative example 1 does not form the multilayer structure.

From the comparison of the example 1 with the comparative example 1, the forming of the multilayer structure shows better image quality than the absence of the multilayer structure.

Example 2

The ink set which is a combination of the treating liquid A and the recording liquid I was used for preparing the printed matter, to thereby evaluate the image quality and the discharge stability. The treating liquid showed the discharge amount M1 of 4.67 [g/cm$^2$], while the recording liquid showed the discharge amount M2 of 4.0162 [g/cm$^2$].

Example 3

The ink set which is a combination of the treating liquid B and the recording liquid I was used for preparing the printed matter, to thereby evaluate the image quality and the discharge stability. The treating liquid showed the discharge amount M1 of 4.63 [g/cm$^2$], while the recording liquid showed the discharge amount M2 of 4.0162 [g/cm$^2$].

Example 4

The ink set which is a combination of the treating liquid C and the recording liquid I was used for preparing the printed matter, to thereby evaluate the image quality and the discharge stability. The treating liquid showed the discharge amount M1 of 4.66 [g/cm$^2$], while the recording liquid showed the discharge amount M2 of 4.0162 [g/cm$^2$].

Example 5

The ink set which is a combination of the treating liquid D and the recording liquid I was used for preparing the printed matter, to thereby evaluate the image quality and the discharge stability. The treating liquid showed the discharge amount M1 of 4.64 [g/cm$^2$], while the recording liquid showed the discharge amount M2 of 4.0162 [g/cm$^2$].

Example 6

The ink set which is a combination of the treating liquid E and the recording liquid I was used for preparing the printed matter, to thereby evaluate the image quality and the discharge stability. The treating liquid showed the discharge amount M1 of 4.58 [g/cm$^2$], while the recording liquid showed the discharge amount M2 of 4.0162 [g/cm$^2$].

Example 7

The ink set which is a combination of the treating liquid F and the recording liquid I was used for preparing the printed matter, to thereby evaluate the image quality and the discharge stability. The treating liquid showed the discharge amount M1 of 4.64 [g/cm$^2$], while the recording liquid showed the discharge amount M2 of 4.0162 [g/cm$^2$].

TABLE 2

| Treating liquid | Treating liquid's surface tension γ1 | Recording liquid | Recording liquid's surface tension γ2 | γ1/γ2 | Treating liquid head's discharge stability |
|---|---|---|---|---|---|
| A | 14.5 | I | 33 | 0.44 | Fair |
| B | 23.0 | | | 0.70 | Excellent |
| C | 26.5 | | | 0.80 | Excellent |
| D | 32.0 | | | 0.97 | Excellent |
| E | 39.0 | | | 1.18 | Excellent |
| F | 41.0 | | | 1.24 | Excellent |

| Treating liquid | Image density | Back-through density | Feathering | Color bleeding | Chroma |
|---|---|---|---|---|---|
| A | 1.098 | 0.123 | Excellent | Excellent | 63.1 |
| B | 1.067 | 0.125 | Excellent | Excellent | 62.9 |
| C | 1.008 | 0.130 | Good | Good | 58.6 |
| D | 0.990 | 0.138 | Fair | Fair | 58.2 |
| E | 0.981 | 0.140 | Poor | Poor | 57.9 |
| F | 0.962 | 0.143 | Poor | Poor | 57.5 |

From the example 2 to the example 7, the following was found: in the image recording method that reacts the two liquids on the record medium, the treating liquid having the surface tension γ1 giving 10≦γ1≦60 can bring about the high-image-quality printed matter. More preferably 10≦γ1≦40, sufficiently preferably 10≦γ1≦35. Moreover, still more preferably 10≦γ1≦30, furthermore preferably 10≦γ1≦25.

γ1>60 may not bring about sufficient image quality, and γ1<15 mN/m is unlikely to cause the treating liquid head's discharge stability, γ1<10 cannot bring about the discharge stability at all.

Moreover, the recording liquid's surface tension γ2 giving 0.3<γ1/γ2<1 can bring about the printed matter having especially high image quality.

Example 8

The ink set which is a combination of the treating liquid G and the recording liquid II was used for preparing the printed matter, to thereby evaluate the discharge stability.

Example 9

The ink set which is a combination of the treating liquid H and the recording liquid II was used for preparing the printed matter, to thereby evaluate the discharge stability.

Comparative Example 2

The ink set which is a combination of the treating liquid I and the recording liquid II was used for preparing the printed matter, to thereby evaluate the discharge stability.

Comparative Example 3

The ink set which is a combination of the treating liquid J and the recording liquid I was used for preparing the printed matter, to thereby evaluate the discharge stability.

TABLE 3

|  | Treating liquid | Defoaming agent density | Treating liquid's head discharge stability |
|---|---|---|---|
| Ex. 2 | B | 0.1 | Excellent |
| Ex. 8 | G | 0.001 | Excellent |
| Ex. 9 | H | 10 | Good |
| Compara. ex. 2 | I | 0 | Poor |
| Compara. ex. 3 | J | 13 | Poor |

From the head for discharging the treating liquid of the example 2, the example 8, the example 9, the comparative example 2, and the comparative example 3, the following was found: In the example 2, the example 8 and the example 9, the treating liquid was discharged from the head; while the comparative example 2 using the treating liquid I rolled and entrapped the bubble, failing to secure the stable discharge. Moreover, the treating liquid J of the comparative example 3 caused clogging to the head's nozzle, failing to secure stable discharge.

Each of the treating liquids used herein had the surface tension γ1 expressed by γ1<35, which is a relatively low surface tension.

Summarizing the above, the treating liquid is to contain the defoaming agent of 0.001% by mass to 10% by mass, which range can prepare the printed matter with the discharge stability secured even with low surface tension.

Example 10

The ink set which is a combination of the treating liquid K and the recording liquid I was used for preparing the printed matter, to thereby evaluate the image quality and the discharge stability. The treating liquid had the discharge amount M1 of 4.63 [g/cm$^2$], while the recording liquid had the discharge amount M2 of 4.0162 [g/cm$^2$].

Example 11

The ink set which is a combination of the treating liquid L and the recording liquid I was used for preparing the printed matter, to thereby evaluate the image quality and the discharge stability. The treating liquid had the discharge amount M1 of 4.64 [g/cm$^2$], while the recording liquid had the discharge amount M2 of 4.0162 [g/cm$^2$].

Example 12

The ink set which is a combination of the treating liquid M and the recording liquid I was used for preparing the printed matter, to thereby evaluate the image quality and the discharge stability. The treating liquid had the discharge amount M1 of 4.67 [g/cm$^2$], while the recording liquid had the discharge amount M2 of 4.0162 [g/cm$^2$].

Comparative Example 4

The ink set containing the recording liquid I only (namely, without the treating liquid) was used for preparing the printed matter, to thereby evaluate the image quality and the discharge stability. The recording liquid had the discharge amount M2 of 4.0162 [g/cm$^2$].

TABLE 4

|  | Treating liquid's aggregate component (cationic) | Recording liquid | Surface tension γ2 | Treating liquid head |
|---|---|---|---|---|
| Ex. 3 | B Fine particle | I | 33 | Excellent |
| Ex. 10 | K Polymer |  |  | Excellent |
| Ex. 11 | L Monomer |  |  | Excellent |
| Ex. 12 | M Polyvalent metal salt |  |  | Excellent |
| Compara. ex. 4 | None |  |  |  |

|  | Image density | Back-through density | Feathering | Color bleeding | Chroma |
|---|---|---|---|---|---|
| Ex. 3 | 1.067 | 0.125 | Excellent | Excellent | 62.9 |
| Ex. 10 | 0.995 | 0.135 | Good | Good | 58.1 |
| Ex. 11 | 0.986 | 0.138 | Good | Good | 57.9 |
| Ex. 12 | 0.978 | 0.144 | Good | Good | 57.6 |
| Compara. ex. 4 | 0.950 | 0.154 | Poor | Poor | 56.1 |

The example 3, the example 10 to the example 12, and the comparative example 4 describe that aggregate component of the treating liquid may be any of the fine particle, the polymer, the monomer, and the polyvalent metal compound. Especially, the fine particle is preferable.

Moreover, the aggregate component of the treating liquid is preferred to be different from the aggregate component of the recording liquid in terms of polarity.

Example 13

The ink set which is a combination of the treating liquid N and the recording liquid I was used for preparing the printed matter, to thereby evaluate the image quality and the discharge stability. The treating liquid had the discharge amount M1 of 4.57 [g/cm$^2$], while the recording liquid had the discharge amount M2 of 4.0162 [g/cm$^2$].

Comparative Example 5

The ink set which is a combination of the treating liquid O and the recording liquid I was used for preparing the printed matter, to thereby evaluate the image quality and the discharge stability. The treating liquid had the discharge amount M1 of 4.69 [g/cm$^2$], while the recording liquid had the discharge amount M2 of 4.0162 [g/cm$^2$].

TABLE 5

| Treating liquid | Treating liquid's ζ potential | Image density | Back-through density | Feathering | Color bleeding | Chroma |
|---|---|---|---|---|---|---|
| Ex. 3 | B | 61 | 1.098 | 0123 | Excellent | Excellent | 63.1 |
| Ex. 13 | N | 31 | 1.023 | 0.133 | Excellent | Excellent | 59.5 |
| Compara. ex. 5 | O | 2 | 0.973 | 0.143 | Fair | Fair | 58.6 |

From the example 3, the example 13, and the comparative example 5, the treating liquid having the ZETA potential $\zeta 1$ of +5 mV to +90 mV is preferable. The ZETA potential $\zeta 1$ of the treating liquid expressed by $\zeta 1 > +90$ mV finds difficulty in obtaining the high-image-quality printed matter, which is inferred as follows: after the treating liquid partly aggregates with the aggregate component of the recording liquid, most of the aggregate components go without damaging the surface charge, and thereby keeping the dispersion stability.

On the other hand, the treating liquid having the potential $\zeta 1$ expressed by $\zeta 1 < +5$ mV may deteriorate the image compared with that obtained with the potential $\zeta 1$ of +5 to +90 mV. It is inferred that week absorbing ability between the treating liquid's aggregate component and the recording liquid's aggregate component is less likely to cause the aggregation, failing to obtain the high-image-quality printed matter.

Example 14

The storage stability of the treating liquid B, the treating liquid N and the treating liquid O was evaluated based on the viscosity change, with the treating liquid stored at 50° C. for three weeks.

TABLE 6

| Treating liquid | Treating liquid's ζ potential | Treating liquid's storage stability |
|---|---|---|
| Ex. 14 | B | 61 | Excellent |
|  | N | 31 | Good |
|  | O | 2 | Poor |

After the storage test at 50° C. for three weeks, the treating liquid B and the treating liquid N showed viscosity increase. The reason therefor is inferred as follows: the treating liquid had a pH close to the pH which causes an isoelectric point of the fine particle contained in the treating liquid B and the treating liquid N. Especially, the treating liquid O that contains the cationic fine particle having the δ potential expressed by $\delta 1 < +5$ mV is not good in terms of storage stability, gelling the treating liquid.

Example 15

In the treating liquid P, the treating liquid B, and the treating liquid O, Ni metal plate of 10 mm×10 mm×0.5 mm was dipped at 50° C. for ten days, to thereby check the corrosion degree of the Ni metal plate.

TABLE 7

| Treating liquid | Aggregate component of treating liquid | pH | Contact liquid durability of treating liquid |
|---|---|---|---|
| Ex. 15 | P | Cationic fine particle | 1 | Poor |
|  | B |  | 4.4 | Excellent |
|  | O |  | 8.2 | Excellent |

The treating liquid P cannot keep sufficient durability due to the corrosion of the Ni metal plate.

Example 16

The storage stability of the treating liquid P, the treating liquid B and the treating liquid O was evaluated based on the viscosity change, with the treating liquid stored at 50° C. for three weeks.

TABLE 8

| Treating liquid | Aggregate component of treating liquid | pH | Storage stability of treating liquid |
|---|---|---|---|
| Ex. 16 | P | Cationic fine particle | 1 | Excellent |
|  | B |  | 4.4 | Excellent |
|  | O |  | 8.2 | Poor |

The basic treating liquid O having pH of over 7 caused the viscosity increase, showing low storage stability.

Example 17

The ink set which is a combination of the treating liquid B and the recording liquid II was used for preparing the printed matter, to thereby evaluate the image quality and the discharge stability. The treating liquid had the discharge amount M1 of 4.67 [g/cm²], while the recording liquid had the discharge amount M2 of 4.0162 [g/cm²].

Example 18

The ink set which is a combination of the treating liquid B and the recording liquid III was used for preparing the printed matter, to thereby evaluate the image quality and the discharge stability. The treating liquid had the discharge amount M1 of 4.59 [g/cm²], while the recording liquid had the discharge amount M2 of 4.0162 [g/cm²].

TABLE 9

| | Treating liquid | Cohesive component of treating liquid | Recording liquid | Aggregate component of recording liquid | Image density |
|---|---|---|---|---|---|
| Ex. 3 | B | Cationic fine particle | I | Pigment | 1.098 |
| Ex. 17 | | | II | Anionic pigment + Anionic fine particle | 1.073 |
| Ex. 18 | | | III | Anionic dye | 1.194 |

| | Back-through density | Feathering | Color bleeding | Chroma |
|---|---|---|---|---|
| Ex. 3 | 0.123 | Excellent | Excellent | 63.1 |
| Ex. 17 | 0.123 | Excellent | Excellent | 63.1 |
| Ex. 18 | 0.143 | Good | Good | 70.6 |

The example 3, the example 17 and the example 18 describe that the recording liquid's component that aggregates with the treating liquid's component may be any of the pigment and the dye, and may have polarity different from that of the treating liquid's component.

After comparison of the image density, the back-through density, the feathering, and the color bleeding, the following description is made:

The recording liquid's component that aggregates with the treating liquid's component is preferred to be the anionic pigment rather than the anionic dye for bringing about the high-image-quality printed matter. Individual comparisons with the image quality of the printed matter without the treating liquid also shows that the recording liquid containing the anionic pigment has a great extent of the image improvement. Moreover, adding the anionic fine particle and the like can increase the image improving effect.

Comparison of the chroma can be summarized as follows:
The recording liquid added by the dye can bring about a higher-chroma printed matter. Individual comparisons with the printed matter without the treating liquid also shows that the pigment has higher chroma improvement. Likewise, adding the anionic fine particle and the like can increase the image improving effect.

Example 19

The storage stability of the recording liquid I, the recording liquid IV, and the recording liquid V was evaluated based on the viscosity change, with the treating liquid stored at 50° C. for three weeks.

TABLE 10

| | Recording liquid | Recording liquid's aggregate component | pH | Recording liquid's storage stability |
|---|---|---|---|---|
| Ex. 19 | IV | Anionic pigment | 6.4 | Poor |
| | I | | 8.3 | Excellent |
| | V | | 12.3 | Excellent |

The recording liquid IV having pH of less than 7 caused the viscosity increase before the reaction, causing low storage stability.

Example 20

In the recording liquid I, the recording liquid IV, and the recording liquid V, Ni metal plate of 10 mm×10 mm×0.5 mm was dipped at 50° C. for ten days, to thereby check the corrosion degree of the Ni metal plate.

TABLE 11

| | Recording liquid | Aggregate component of recording liquid | pH | Contact liquid durability of recording liquid |
|---|---|---|---|---|
| Ex. 20 | IV | Anionic pigment | 6.4 | Excellent |
| | I | | 8.3 | Excellent |
| | V | | 12.3 | Poor |

With the recording liquid V, the metal plate does not keep the durability due to the corrosion.

Example 3 and Comparative Example 6

Printed matters were prepared by using an ink set which is a combination of the treating liquid B and the recording liquid I and an ink set which is a combination of the treating liquid N and the recording liquid I, to thereby evaluate the image quality. The treating liquid showed the discharge amount M1 of 4.57 [g/cm$^2$], and the recording liquid showed the discharge amount M2 of 4.0162 [g/cm$^2$].

TABLE 12

| | Treating liquid | pH1 (pH of treating liquid) | Recording liquid | pH2 (pH of recording liquid) | pH2 − pH1 |
|---|---|---|---|---|---|
| Ex. 3 | B | 4.4 | I | 8.3 | 3.9 |
| Compara. ex. 6 | N | 8.1 | I | 8.3 | 0.2 |

| | Image density | Back-through density | Feathering | Color bleeding | Chroma |
|---|---|---|---|---|---|
| Ex. 3 | 1.098 | 0.123 | Excellent | Excellent | 63.1 |
| Compara. ex. 6 | 1.023 | 0.133 | Excellent | Excellent | 59.5 |

From the example 3 and the comparative example 6, the pH difference meeting pH2−pH1≦2 can bring about a sufficient image quality. This is because the acid or the base having high density has strengthened the reaction at the contact of the two liquids.

Example 20

A printed matter was prepared by using an ink set which is a combination of the treating liquid B and the recording liquid I, to thereby evaluate the image quality. The treating liquid showed the discharge amount M1 of 5.4 [g/cm$^2$], and the recording liquid showed the discharge amount M2 of 6.9 [g/cm$^2$].

Example 21

A printed matter was prepared by using an ink set which is a combination of the treating liquid A and the recording liquid I, to thereby evaluate the image quality. The treating liquid showed the discharge amount M1 of 10.3 [g/cm$^2$], and the recording liquid showed the discharge amount M2 of 20.9 [g/cm$^2$].

Comparative Example 21

A printed matter was prepared by using an ink set which is a combination of the treating liquid B and the recording liquid I, to thereby evaluate the image quality. The treating liquid showed the discharge amount M1 of 3.9 [g/cm²], and the recording liquid showed the discharge amount M2 of 20.9 [g/cm²].

Comparative Example 22

A printed matter was prepared by using an ink set which is a combination of the treating liquid B and the recording liquid I, to thereby evaluate the image quality. The treating liquid showed the discharge amount M1 of 10.3 [g/cm²], and the recording liquid showed the discharge amount M2 of 4.29 [g/cm²].

TABLE 13

| | Treating liquid | Treating liquid's discharge amount M1 | Recording liquid | Recording liquid's discharge amount M2 | M1/M2 |
|---|---|---|---|---|---|
| Ex. 3 | 8 | 4.6 | I | 5.4 | 0.85 |
| Ex. 21 | | 5.4 | | 6.9 | 0.78 |
| Ex. 22 | | 10.3 | | 20.9 | 0.49 |
| Compara. ex. 21 | | 3.9 | | 20.9 | 0.19 |
| Compara. ex. 22 | | 16.3 | | 5.4 | 3.02 |

| | Image density | Back-through density | Feathering | Color bleeding | Chroma |
|---|---|---|---|---|---|
| Ex. 3 | 1.098 | 0.123 | Excellent | Excellent | 63.1 |
| Ex. 21 | 1.233 | 0.120 | Excellent | Excellent | 71.7 |
| Ex. 22 | 1.556 | 0.121 | Excellent | Excellent | 73.9 |
| Compara. ex. 21 | 1.156 | 0.135 | Poor | Poor | 59.0 |
| Compara. ex. 22 | 1.008 | 0.138 | Fair | Fair | 57.7 |

From the example 3, the example 21, the example 22, the comparative example 21, and the comparative example 22, the ratio of the treating liquid's discharge amount M1 relative to the recording liquid's discharge amount M2 expressed by $0.2 \leq M1/M2 \leq 3.0$ can bring about the high-image-quality printed matter.
M1/M2<0.2 cannot bring about a sufficient aggregate reaction of the recording liquid since the treating liquid's discharge amount is not sufficient relative to the recording liquid's discharge amount. With this, the image density is not sufficient, thus increasing the back-through density, and thus causing the feathering and the color bleeding, resulting in disordered image. On the contrary, with M1/M2>3.0, treating liquid's discharge amount becomes too much relative to the recording liquid' discharge amount, thereby the aggregate reaction of the treating liquid is not sufficient, and thereby the permeation of the recording liquid cannot be prevented sufficiently, likewise, failing to obtain sufficient image density. With this, the back-through density image may increase, thus causing the feathering and the color bleeding, resulting in disordered image.

An ink set including a recording liquid and a treating liquid is capable of obtaining a high-quality-image printed matter. The high-quality-image printed matter is provided by using the ink set including the recording liquid and the treating liquid, where the component and property of the treating liquid and the recording liquid are adjusted, moreover a combination of the component and the property is adjusted. The ink set includes: the recording liquid which includes a coloring material; and the treating liquid which includes a component reactive with a component of the recording liquid. By superimposing the treating liquid and the recording liquid on a record medium, a record part is formed which includes a first layer formed of the recording liquid, and a second layer formed of the treating liquid. The treating liquid has the surface tension γ expressed by 10 mN/m≦γ≦60 mN/m.

What is claimed is:

1. An ink set, comprising:
   a recording liquid which comprises a coloring material; and
   a treating liquid which comprises a component reactive with a component other than coloring material in the recording liquid and which has a surface tension γ in a range expressed by 10 mN/m≦γ≦60 mN/m,
   wherein the recording liquid comprises a component reactive with a component in the treating liquid, and
   wherein a record part formed by applying the treating liquid and the recording liquid to a record medium comprises a first layer formed of the recording liquid and a second layer formed of the treating liquid,
   said first layer and second layer forming layer regions disposed with at least the first layer disposed on and covering the second layer, and said first layer and second layer retaining respectively therein color aggregates and fine particle aggregates, and
   a surface tension γ1 of the treating liquid is smaller than a surface tension γ2 of the recording liquid.

2. The ink set according to claim 1, wherein the surface tension γ1 of the treating liquid and the surface tension γ2 of the recording liquid meets an expression γ2−γ1≦2 mN/m.

3. The ink set according to claim 1, wherein the surface tension γ1 of the treating liquid and the surface tension γ2 of the recording liquid meets an expression γ1/γ2<1.

4. The ink set according to claim 1, wherein the treating liquid defines a pH given by pH1 and the recording liquid defines a pH given by pH2, meeting an expression pH2−pH1≧2.

5. The ink set according to claim 1, wherein the treating liquid has a discharge amount M1 and the recording liquid has a discharge amount M2, meeting an expression 0.2≦M1/M2≦3.0.

6. The ink set according to claim 1, wherein
   the first layer and second layer retain separated therefrom said color aggregates and the fine particle aggregates, and
   the color aggregates are trapped by a porosity of the recording medium.

7. An image recording method, comprising:
   applying a stimulation to an ink set; and
   jetting the ink set, to thereby record an image, wherein the ink set comprises: a recording liquid which comprises a coloring material; and a treating liquid which comprises a component reactive with a component other than coloring material in the recording liquid and which has a surface tension γ in a range expressed by 10 mN/m≦γ≦60 mN/m, wherein the recording liquid comprises a component reactive with a component in the treating liquid, and wherein a record part formed by applying the treating liquid and the recording liquid to a record medium comprises a first layer formed of the recording liquid and a second layer formed of the treating liquid,
   said first layer and second layer forming layer regions disposed with at least the first layer disposed on and covering the second layer, and said first layer and second layer retaining respectively therein color aggregates and fine particle aggregates.

8. The image recording method according to claim 7, wherein the stimulation is at least one selected from the group consisting of a heat, a pressure, a vibration, and a light.

9. An image recording apparatus, comprising:
a jetting unit configured to jet an ink set by applying a stimulation to the ink set to thereby record an image,
wherein the ink set comprises:
a recording liquid which comprises a coloring material; and a treating liquid which comprises a component reactive with a component other than coloring material in the recording liquid and which has a surface tension γ in a range expressed by 10 mN/m≦γ≦60 mN/m,
wherein the recording liquid comprises a component reactive with a component in the treating liquid, and
wherein a record part formed by applying the treating liquid and the recording liquid to a record medium comprises a first layer formed of the recording liquid and a second layer formed of the treating liquid,
said first layer and second layer forming layer regions disposed with at least the first layer disposed on and covering the second layer, and said first layer and second layer retaining respectively therein color aggregates and fine particle aggregates.

10. The image recording apparatus according to claim 9, wherein the stimulation is at least one selected from the group consisting of a heat, a pressure, a vibration, and a light.

11. The image recording apparatus according to claim 9, wherein the jetting unit comprises a discharging unit which is configured to discharge the recording liquid and the treating liquid independently of each other.

12. The image recording apparatus according to claim 9, wherein the image recording apparatus comprises a receptacle for receiving the recording liquid and the treating liquid independently of each other.

13. A treating liquid cartridge, comprising:
a receptacle,
wherein the receptacle receives therein a treating liquid which comprises a component reactive with a component other than coloring material in a recording liquid and which has a surface tension γ in a range expressed by 10 mN/m≦γ≦60 mN/m,
wherein a record part formed by applying to a record medium the treating liquid and the recording liquid comprises a first layer formed of the recording liquid and a second layer formed of the treating liquid,
said first layer and second layer forming layer regions disposed with at least the first layer disposed on and covering the second layer, and said first layer and second layer retaining respectively therein color aggregates and fine particle aggregates.

14. A recording liquid cartridge, comprising:
a receptacle,
wherein the receptacle receives therein a recording liquid which comprises:
a coloring material; and a component reactive with a component other than coloring material in a treating liquid,
wherein a record part formed by applying the treating liquid and the recording liquid to a record medium comprises a first layer formed of the recording liquid and a second layer formed of the treating liquid,
said first layer and second layer forming segregated layer regions disposed with at least the first layer disposed on and covering the second layer, and said first layer and second layer retaining respectively therein color aggregates and fine particle aggregates.

15. An ink recorded matter, comprising:
an image,
wherein the image is formed on a record medium by using an ink set which comprises:
a recording liquid which comprises a coloring material; and a treating liquid which comprises a component reactive with a component other than coloring material in the recording liquid and which has a surface tension γ in a range expressed by 10 mN/m≦γ≦60 mN/m,
wherein the recording liquid comprises a component reactive with a component in the treating liquid, and
wherein a record part formed by applying the treating liquid and the recording liquid to a record medium comprises a first layer formed of the recording liquid and a second layer formed of the treating liquid,
said first layer and second layer forming layer regions disposed with at least the first layer disposed on and covering the second layer, and said first layer and second layer retaining respectively therein color aggregates and fine particle aggregates.

* * * * *